US005177386A

United States Patent [19]

Shimada

[11] Patent Number: 5,177,386

[45] Date of Patent: Jan. 5, 1993

[54] VIBRATION GENERATOR ADJUSTABLE DURING OPERATION

[75] Inventor: Fubito Shimada, Kawasaki, Japan

[73] Assignee: Kencho Kobe Co., Ltd., Tokyo, Japan

[21] Appl. No.: 749,361

[22] Filed: Aug. 23, 1991

[30] Foreign Application Priority Data

| | | | |
|---|---|---|---|
| Aug. 30, 1990 | [JP] | Japan | 2-226509 |
| May 2, 1991 | [JP] | Japan | 3-101031 |
| May 2, 1991 | [JP] | Japan | 3-101032 |
| May 2, 1991 | [JP] | Japan | 3-101033 |

[51] Int. Cl.[5] ........................ H02K 7/075; B06B 1/16

[52] U.S. Cl. ........................ 310/81; 74/61

[58] Field of Search ............... 37/DIG. 18; 74/61, 87; 310/51, 81; 405/182, 271

[56] References Cited

U.S. PATENT DOCUMENTS

| | | | |
|---|---|---|---|
| 3,878,733 | 4/1975 | Tertinek | 404/113 |
| 4,018,290 | 4/1978 | Schmidt . | |
| 4,113,034 | 9/1978 | Carlson | 74/61 |
| 4,211,121 | 7/1980 | Brown | 73/87 |
| 4,389,137 | 6/1983 | Riedl | 74/61 |
| 4,766,771 | 8/1988 | Bailey et al. | 74/61 |
| 4,793,196 | 12/1988 | Davis et al. | 74/61 |
| 4,819,740 | 4/1989 | Warrington et al. . | |

FOREIGN PATENT DOCUMENTS

| | | | |
|---|---|---|---|
| 2409417 | 9/1975 | Fed. Rep. of Germany | 310/81 |
| 3515690C1 | 9/1986 | Fed. Rep. of Germany . | |
| 3341084C2 | 6/1987 | Fed. Rep. of Germany . | |
| 1230225 | 4/1971 | United Kingdom . | |

*Primary Examiner*—Steven L. Stephan
*Assistant Examiner*—D. L. Rebsch
*Attorney, Agent, or Firm*—Pennie & Edmonds

[57] ABSTRACT

A vibration generator comprises a first rotational shaft 21 and second rotational shaft 22, with fixed driving gears 31 and 33, movable driving gears 32 and 34, fixed eccentric weights 51A and 52A, and movable eccentric weights 51B and 52B, and on the outer periphery of the phase adjustment shaft 23 which is arranged in parallel therewith, spiral grooves 61 and 62 are provided at two locations in the rotative directions opposite to each other, and at the same time, on the inner periphery of a pair of phase adjustment gears 35 and 36, pins 63 and 64 are planted to be slidably fitted into the above-mentioned spiral grooves 61 and 62. Then, the phase adjustment shaft 23 is forced by a cylinder 50 in the axial direction.

The vibromotive force can be varied arbitrarily and infinitely, even during operation; yet the structure is simple and rational, and is fabricated easily.

13 Claims, 18 Drawing Sheets

VIBRATION GENERATOR ADJUSTABLE DURING OPERATION

BACKGROUND OF THE INVENTION

1. Field of the Invention

The present invention relates to a vibration generator used for a vibrating pile driver, various shakers, sieving equipment, and the like and, more particularly, to the vibration generator capable of obtaining an arbitrarily and infinitely changeable vibromotive force or amplitude by rotating eccentric weights.

2. Description to the Prior Art

As the vibration generator utilizing the centrifugal force which is generated by rotating eccentric weights, there is known a vibration generator in which even numbers of a pair of rotational shafts with eccentric weights are rotatively supported in a casing member in parallel with each other and at the same time, driving gears are mounted on each of the rotational shafts to allow the adjacent gears to engage each other, so that one group of the rotational shafts and the other group thereof are rotated in the opposite directions to offset the horizontal components of the centrifugal force generated by the eccentric weights mounted on each of the rotational shafts and to add the vertical components simultaneously; thus providing the casing member with the vibromotive force by the aforesaid vertical components in the vertical direction, for example.

In a vibration generator such as this, the entire body of the vibration generator is vibrated with frequency in response to the revolution of the rotational shaft by means of supporting the casing member through springs or dampers. As a result, it is possible to drive in the pile or draw it out by actuating the vibration generator while supporting a pile such as a steel sheet pile with the casing member through a chuck, and it is also possible to perform mixing work or sieving work by incorporating such vibrating generator with a shaker or sieving equipment.

In the conventional vibration generator mentioned above, the eccentric weights are fixed to the rotational shafts, thus making it difficult to modify the vibromotive force or amplitude arbitrarily during operation. Furthermore, in a vibration generator such as this, the driving power required to rotate the eccentric weights at rest at the initial stage of the operation is extremely large as compared with the driving power required to rotate the weights which have once arrived at the rated revolution thereof. Accordingly, if the driving power required to rotate the eccentric weights at rest before bringing them to the rated revolution could be reduced, it should be possible to implement the miniaturization of the driving power source such as a motor, thereby improving significantly the utilization efficiency of energy such as power to be consumed. Therefore, there is a strong demand that a method should be implemented thereby to reduce with ease the driving power required for the revolution of the rotational shafts at the initial stage of the operation.

Also, in the vibration generator used for a vibrating pile driver, for example, it is required to implement a method thereby to modify with ease the vibromotive force or amplitude in response to the ground condition and the like at a location where the pile is driven in so as to improve the operativity of the pile driving or that of the pile drawing, or a method thereby to prevent the resonance phenomena generated at the time of activating or braking the vibration.

To meet such demands as mentioned above, several vibration generators capable of modifying the vibromotive force or amplitude are in consideration at present. However, there exists a disadvantage in all of them that the number of parts is great due to the complicated structure, leading unavoidably to a significant cost increase.

In consideration of these problems, the object of the present invention is to provide a vibration generator capable of varying the vibromotive force or amplitude arbitrarily and infinitely even during the operation, which is yet simply and rationally structured so as to be built with ease.

SUMMARY OF THE INVENTION

In order to achieve the above-mentioned object, a vibration generator according to the present invention comprises fundamentally a first rotational shaft supported rotatively by a casing member with a first fixed driving gear and a first fixed eccentric weight fitted thereto from the outside, as well as with a first movable driving gear and first movable eccentric weight coupled to the aforesaid gear, fitted thereto from the outside to rotate relatively; a second rotational shaft supported rotatively by the above-mentioned casing member in parallel with the above-mentioned first rotational shaft with a second fixed driving gear engaging the above-mentioned first fixed driving gear and a second fixed eccentric weight fitted thereto from the outside as well as with the a second movable driving gear engaging the above-mentioned first movable driving gear and a second movable eccentric weight coupled to the aforesaid gear, fitted thereto from the outside to rotate relatively; a phase adjustment shaft arranged rotatively in parallel with the above-mentioned first and second rotational shafts; a pair of phase adjustment gears fitted to the above-mentioned phase adjustment shaft from the outside in such a manner that at least one of them is fitted to be rotated relatively while its traveling in the axial direction is restricted, and that one of them engages either one of the above-mentioned first and second fixed driving gears and the other engages either one of the first and second movable driving gears; and phase changing means for rotating one of the aforesaid pair of phase adjustment gears relatively against the other.

In such vibration generator according to the present invention, various kinds of phase changing means can be employed. For example, there is considered a combination of driving means to cause the phase adjustment shaft to be forcibly traveled in the axial direction and motion converting means to convert the linear motion of the phase adjustment shaft in the axial direction into the relative rotation of the phase adjustment gears. Specifically, among some others, a phase changing means can be constructed in such a manner that the phase changing means is provided in a spiral groove or convex column arranged at two locations on the outer periphery of the phase adjustment shaft in the turning directions opposite to each other and in the inner peripheries of the pair of phase adjustment gears, and is combined with a driving means to forcibly move the convex portion or concave portion slidably fitted into the above-mentioned spiral groove or convex column as well as the above-mentioned phase adjustment shaft in the axial direction, or the phase changing means is constructed with a pin projectively installed along the radial direction of the phase adjustment shaft, and an extended boss having an elongated spiral hole formed thereon to fit the abovementioned pin, which is interlocked with at least one of the above-mentioned pair of phase adjustment gears, and a driving means to forcibly move the above-mentioned phase adjustment shaft in the axial direction.

Also, as another embodiment of the vibration generator according to the present invention, it may be possible to divide the phase adjustment shaft into two divided portions having a first adjustment shaft and a second adjustment shaft respectively, and the structure is arranged so that the first adjustment shaft is made relatively movable in the axial direction and relatively rotative against the second adjustment shaft through a first motion converting means to convert the linear motion into rotational motion, and these constituents are arranged to travel on the same axial line to be detouchable. With such structure as this, a pair of phase adjustment gears are made relatively rotative with respect to the first adjustment shaft and the second adjustment shaft. In this case, the structure may be arranged so that one of the phase adjustment gears is fitted from the outside to either one of the first adjustment shaft and the second adjustment shaft to rotate relatively through a second motion converting means to convert the linear motion into the rotational motion; the structure may also be arranged so that the other one of them is fitted from the outside to either one of the first adjustment shaft and the second adjustment shaft. Besides, the structure may be arranged so that both the first and second motion converting means are incorporated.

Further, as still another embodiment of the present invention, the structure is arranged so as to form a hydraulic actuation chamber between the outer periphery of the phase adjustment shaft and one of the above-mentioned phase adjustment gears, and by arranging the supply and exhaust of fluid to and from the aforesaid hydraulic actuation chamber, these constituents are allowed to function as a phase changing means; hence enabling the above-mentioned phase adjustment gears to rotate relatively with respect to the above-mentioned phase adjustment shaft. In this case, it is possible to configure the hydraulic actuation chamber as a rotational cylinder by partitioning the hydraulic actuation chamber with the fixed partition wall portion fixed to the phase adjustment shaft and the movable partition wall portion fixed to the phase adjustment gears.

In the vibration generator of the present invention having the structure set forth above, a pair of phase adjustment gears are relatively rotated in the directions opposite to each other by forcibly moving the phase adjustment shaft in the axial direction, or causing a second adjustment shaft to be forcibly moved in the axial direction against a first adjustment shaft, or performing the supply and exhaust of fluid to and from a hydraulic actuation chamber, and the pair of the phase adjustment gears are rotated integrally with the phase adjustment shaft in such a state where one of the phases is relatively advanced or delayed against the other phase.

Then, when the phase of the pair of phase adjustment gears changes in such a fashion, a phase difference is generated between the first and second fixed eccentric weights mounted on the first and second rotational shafts, to which the rotation of one of the pair of phase adjustment gears is transmitted, and the first and second movable eccentric weights coupled to the first and second movable driving gears to which the rotation of the other one of the pair of phase adjustment gears is transmitted. In this way, whereas the horizontal component generated to each of the eccentric weights is always offset, the sum of the vertical component generated to each of the eccentric weights is varied in response to the phase difference between the first and second fixed eccentric weights and the first and second movable eccentric weights. As a result, the vibromotive force or amplitude given to the casing member through the first and second rotational shafts is caused to vary.

BRIEF DESCRIPTION OF THE DRAWINGS

Hereinafter, the embodiments of the present invention will be described in conjunction with the accompanying drawings, in which.

DESCRIPTION OF THE PREFERRED EMBODIMENTS

Figure 1:
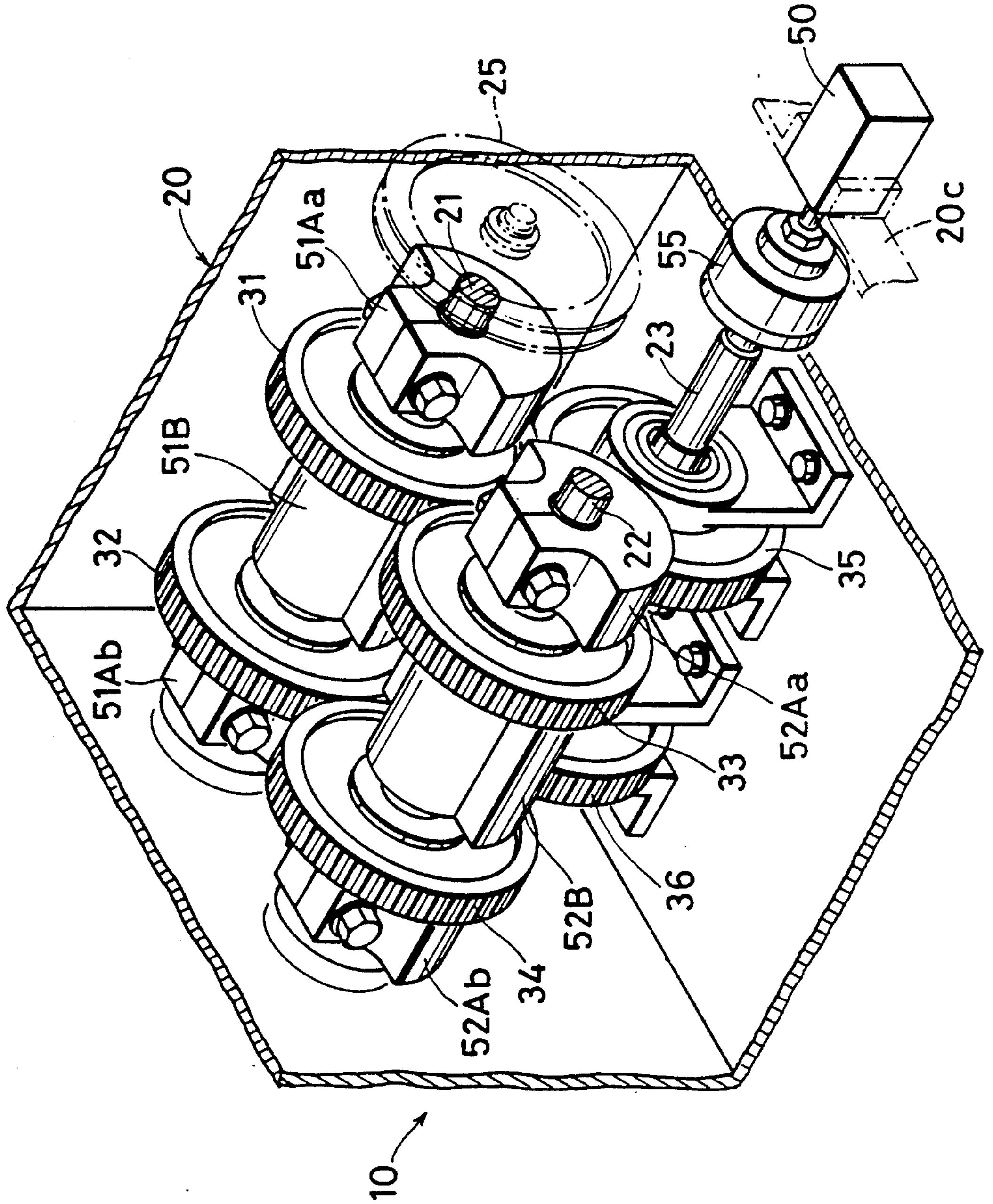
FIG. 1 is a perspective view showing the principal part of a first embodiment of the vibration generator according to the present invention.
Figure 5A:
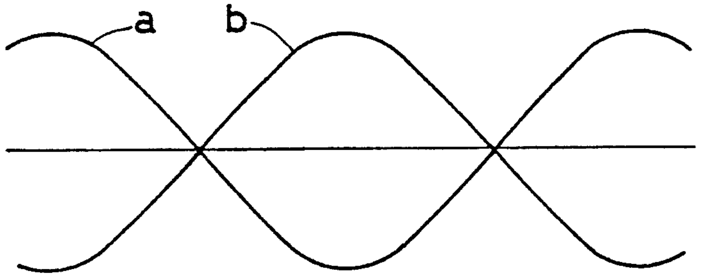
FIGS. 5 A, B, and C illustrate sequential operation steps of the first embodiment.

The First Embodiment (FIG. 1 FIG. 5)

Figure 2:
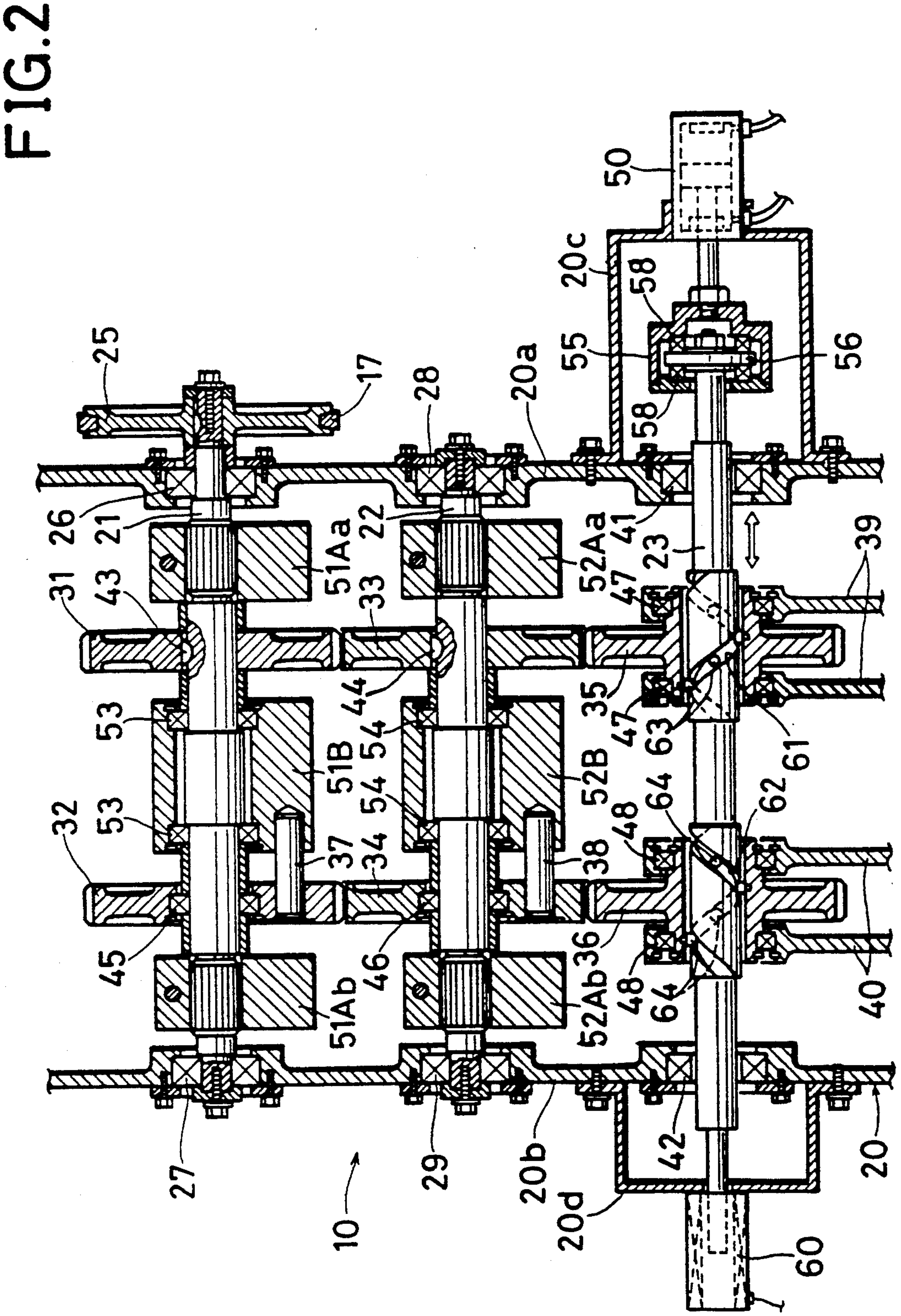
FIG. 2 is a cross-sectional view showing the principal part of the first embodiment.
Figure 3:
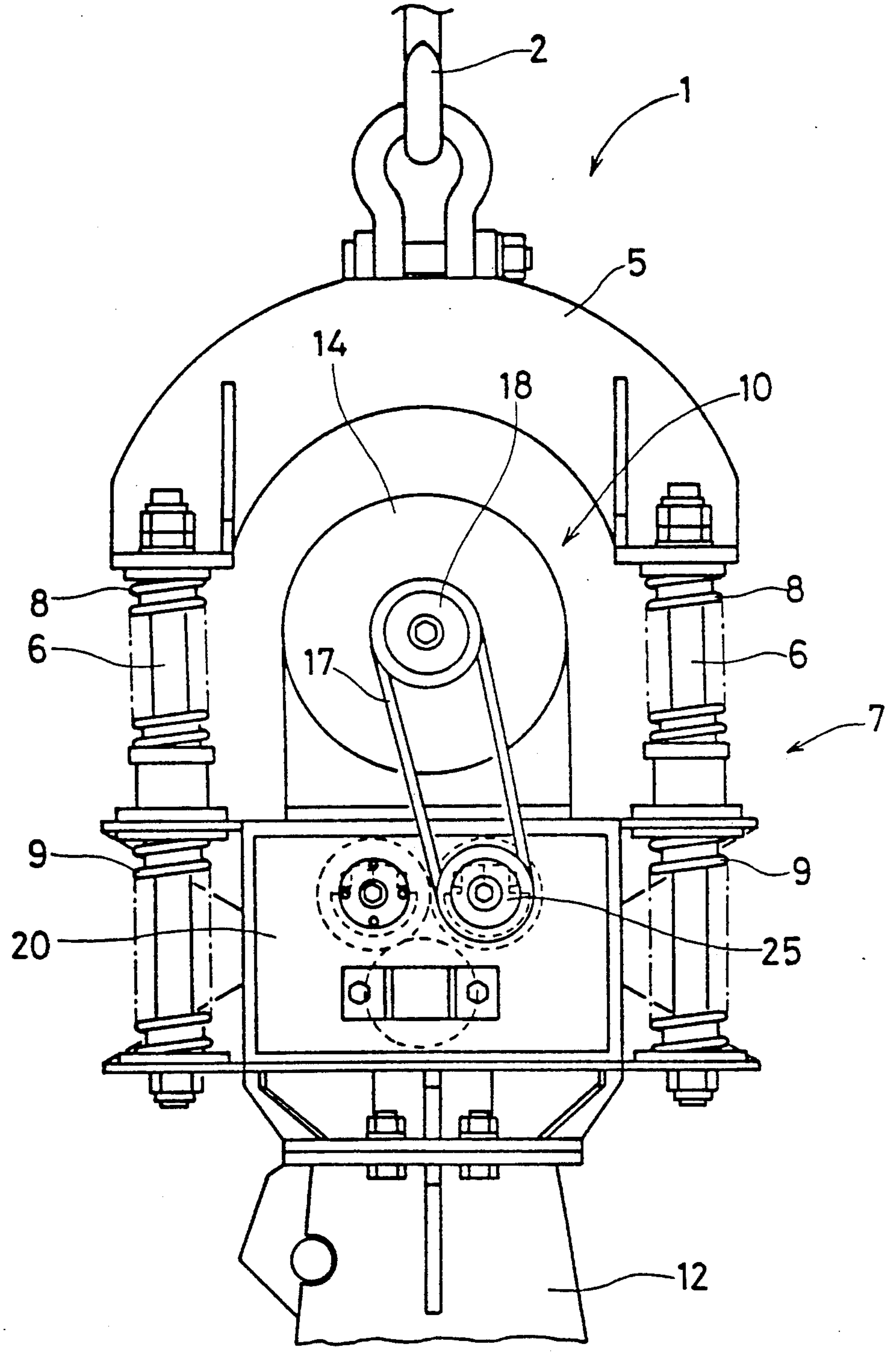
FIG. 3 is a front elevation showing an example of the vibrating pile driver to which the vibration generator of the present invention is applicable.

FIG. 1 is a perspective view showing the principal part of a first embodiment of the vibration generator according to the present invention and FIG. 2, a development thereof. FIG. 3 is a front elevation showing an example of the vibrating pile driver to which the embodiment shown in FIG. 1 and FIG. 2 is applicable.

In FIG. 3, the vibrating pile driver 1 comprises a hanger 5 provided with a sling portion where a hook 2, which is a hanging means adopted by a crane or the like, is hooked; four guide rods 6 hanging from this hanger 5 and a shock absorber 7 having a pair of coil springs 8 and 9 compressedly mounted on the rods vertically; an electric motor 14, a driving power source, supported by the hanger 5 through the shock absorber 7; a casing member 20; a vibration generator 10 according to the present embodiment provided with a vibration generating unit arranged in the casing member 20, a power transmission belt 17, pulleys 18 and 25 and the like; a chuck 12, which supports a pile such as a steel sheet pile in a holding fashion, beneath the vibrating generator 10, and others. This vibrating pile driver 1 is publicly known with the exception of the vibromotive force generating unit which will be described later. The driving power source is not limited to the electric motor, either, but an arbitrary means such as a hydraulic motor or the like may be employed. At the same time, it may also be possible to use an appropriate shock absorber other than the one shown in FIG. 3.

The vibromotive force generating unit provided in the casing member 20 comprises, as shown in FIG. 1 and FIG. 2 in detail, a first rotational shaft 21 to which the rotational driving power is transmitted from an electric motor 14 through a pulley 25; a second rotational shaft 22 arranged substantially just beside the first rotational shaft 21 in parallel therewith; and a phase adjustment shaft 23 arranged rotatively beneath these first and second rotational shafts 21 and 22 in parallel therewith.

In this respect, although the phase adjustment shaft 23 is described as being positioned beneath the first and second rotational shafts 21 and 22 in the present embodiment, it should be readily understandable that as far as the phase adjustment shaft 23 is rotatively arranged in parallel with the first and second rotational shafts 21 and 22, its location is not limited to the one positioned beneath them.

Also, shown in FIG. 2, the first rotational shaft 21 is rotatively supported by side walls 20*a* and 20*b* of the casing member 20 through bearings 26 and 27 at its respective ends, and to this first rotational shaft 21, a first fixed driving gear 31 is fitted from the outside and fixed by a key 43 and at the same time, divided first fixed eccentric weights 51Aa and 51Ab (a reference mark 51A is used to designates the weights 51Aa and 51Ab in combination) are fitted from the outside and fixed each in the vicinity of the side walls 20*a* and 20*b* of the casing member 20 by spline coupling. Also, a first movable driving gear 32, and a first movable eccentric weight 51B, which is coupled thereto by a connecting pin 37 to rotate integrally therewith, are respectively fitted to the first rotational shaft from the outside through bearings 45 and 53 to enable them to rotate relatively.

Also, the second rotational shaft 22 is rotatively supported by the side walls 20*a* and 20*b* of the casing member 20 through bearings 28 and 29, and to this second rotational shaft 22, a second fixed driving gear 33 is fitted from the outside and fixed by a key 44 to engage with the first fixed driving gear 31 and at the same time, divided second fixed eccentric weights 52Aa and 52Ab (a reference mark 52A is used to designate the 52Aa and 52Ab in combination) are fitted from the outside and fixed each in the vicinity of the side walls 20*a* and 20*b* of the casing member 20 by spline coupling. Also, a second movable driving gear 34, and a second movable eccentric weight 52B, which is coupled thereto by a connecting pin 38 to rotate integrally therewith, are fitted respectively to the second rotational shaft from the outside through bearings 46 and 54 to enable them to rotate relatively.

In this respect, the fixing means for the first and second rotational shafts 21 and 22 and the fixed eccentric weights 51A and 52A or fixing means for the first and second movable driving gears 32 and 34 and the first and second movable eccentric weights 51B and 52B are not limited to the spline coupling and connecting pin as shown here, and it should be clear that any means is applicable if only such means is functionable as a fixing means suited for the purpose.

Further, the phase adjustment shaft 23 is supported by the side walls 20*a* and 20*b* of the casing member 20 through bearings 41 and 42, in parallel with the first and second rotational shafts 21 and 22, to rotate and travel in the axial direction, and on the outer periphery of this phase adjustment shaft 23, spiral grooves 61 and 62 are provided apart from each other at a predetermined distance in the turning direction opposite to each other (one is righthand threading type and the other, left-hand threading type). Also, as a driving means for moving such phase adjustment shaft 23 in the axial direction, a double acting cylinder 50 with an automatic locking system is installed on the wall portion 20*c* attachably provided for the casing member 20.

In this respect, the transmission of the thrust from the cylinder 50 to the phase adjustment shaft 23 is performed through a pair of thrust bearings 58 which are provided between a housing type coupler 55 mounted on the leading end of the piston rod of the cylinder 50 and a T type coupler 56 mounted on one end of the phase adjustment shaft 23. Also, at the other end of the phase adjustment shaft 23, an appropriate position detector is provided to control the traveling amount of the phase adjustment shaft 23. In the present embodiment, a variable transformer type position detector 60 is installed on the wall portion 20*d* attachably provided for the casing member 20, and the iron core mounted on the other end of the phase adjustment shaft 23 is inserted into the detector. However, it may also be possible to utilize a potentiometer for the detection in this respect.

Then, in conjunction with the above-mentioned phase adjustment shaft 23, first and second phase adjustment gears 35 and 36 are arranged. On the inner peripheries of the first and second phase adjustment gears 35 and 36, a plurality of fitting pins 63 and 64 are respectively provided to slidably fit in the spiral grooves 61 and 62 of the phase adjustment shaft 23, and while rotatively supported by bearing saddles 39 and 40 attachably provided for the casing member, these gears are fitted to the phase adjustment shaft 23 from the outside in such a manner that the traveling of these gears in the axial direction is restricted, and that the first phase adjustment gear 35 engages the second fixed driving gear 33 and the second phase adjustment gear 36 engages the movable driving gear 34.

In this respect, the above-mentioned first and second fixed eccentric weights 51A and 52A and the first and second movable eccentric weights 51B and 52B are substantially fan-shaped having a center angle of 180 degrees respectively, for example, and one thickness of the first and second fixed eccentric weights 51A and 52A is approximately half of the first and second movable eccentric weights 51B and 52B. The weight and contour of the first and second fixed eccentric weights 51A and 52A and the first and second movable eccentric weights 51B and 52B (including pins 37 and 38, and others) are defined to make the eccentric moments thereof identical, and the positions thereof are determined to balance them in the left and right directions.

However, the contour, thickness, and the like of the first and second fixed eccentric weights 51A and 52A as well as the first and second movable eccentric weights 51B and 52B are not limited to those mentioned above, and it is needless to mention that the weight and contour of these weights and the positioning thereof may be defined in any way, if only the eccentric moments become identical and the positioning allows them to be balanced in the left and right directions. Also, the item such as the teeth number of each of the gears 31-36 is all the same, and when the gears are engaged, a uniform rotation is obtainable.

In the vibration generator 10 embodying the present invention with the structure set forth above, the rotational driving power of the motor 14 is transmitted through the belt 17 to the phase adjustment shaft 23 sequentially through the first rotational shaft 21→the first fixed driving gear 31→the second fixed driving gear 33→the first phase adjustment gear 35→the fitting pin 63→the groove 61. Then the first rotational shaft 21, the second rotational shaft 22, and the phase adjustment shaft 23 are rotated in synchronism and at the same time, the rotation of the adjustment shaft 23 is transmitted to the groove 62→the fitting pin 64→the second phase adjustment gear 36→the second movable driving gear 34→the first movable driving gear 32 sequentially.

Here, if the phase adjustment shaft 23 is moved forcibly in the axial direction by the cylinder 50, the first phase adjustment gear 35 and the second phase adjustment gear 36 are rotated in the directions opposite to each other in response to the traveling distance of the phase adjustment shaft 23 by the circumferential components of the spiral grooves 61 and 62 because the fitting pins 63 and 64 provided on the inner peripheries of the first adjustment gear 35 and the second adjustment gear 36 are fitted into the spiral grooves 61 and 62 provided at two locations on the outer periphery of this phase adjustment shaft 23 in the turning directions opposite to each other, and these phases are advance or delayed by degrees of an equal angle. In a state such as this, the first phase adjustment gear 35 and the second phase adjustment gear 36 are rotated integrally with the phase adjustment shaft 23.

Then, if the phases of the first phase adjustment gear 35 and the second phase adjustment gear 36 are thus varied, the phases of the first and second rotational shafts and the first and second fixed eccentric weights 51A and 52A mounted thereon respectively are also varied by degrees of an equal angle. Also, the first and second movable driving gears 32 and 34 are rotated relatively with respect to the first and second rotational shafts 21 and 22, and with this, the phases of the first and second movable eccentric weights 51B and 52B coupled to the first and second movable driving gears 32 and 34 are also varied by degrees of an equal angle in the direction opposite to the above-mentioned first and second fixed weights 51A and 52A. Hence, the vibromotive force or amplitude given to the casing member 20 through the first and second rotational shafts 21 and 22 are caused to vary.

Figure 4A:
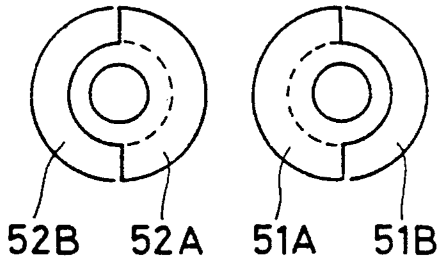
FIGS. 4 A, B, and C illustrate sequential operation steps of the first embodiment.
Figure 4B:
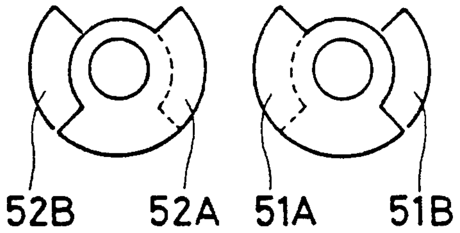
Figure 4C:
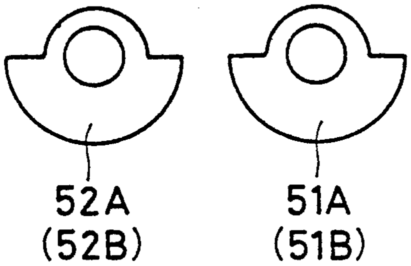
Figure 5B:
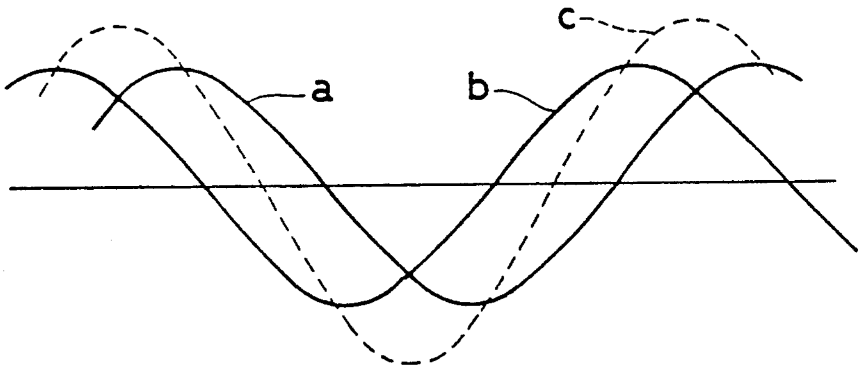
Figure 5C:
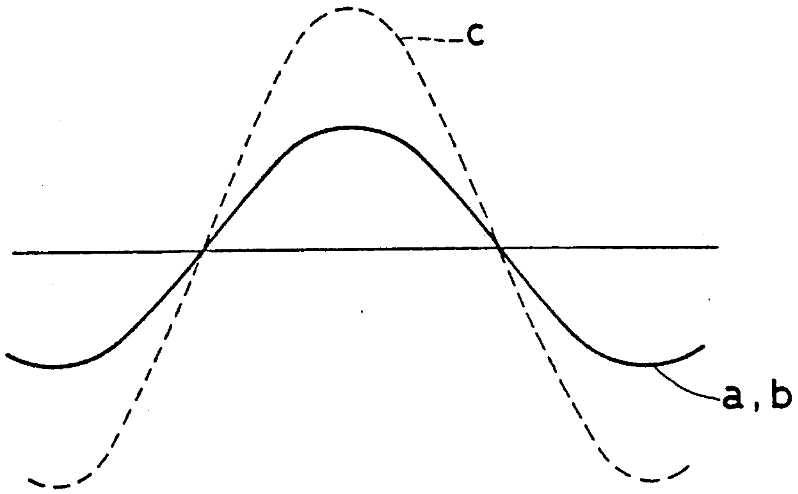

In this case, the horizontal components of the centrifugal force generated to each of the eccentric weights 51A, 52A, 51B, and 52B mounted on the first and second rotational shafts 21 and 22 are offset and at the same time, the vertical components of the centrifugal force are added, and by the vertical components thus obtained, the vertical vibromotive force or amplitude is given to the casing member 20. Then, as shown in FIG. 4A, if the phase difference between the first and second fixed eccentric weights 51A and 52A and the first and second movable eccentric weights 51B and 52B, which are arranged on the same shaft themselves, are 180 degrees, the vibromotive forces or amplitudes obtainable therefrom are offset and become zero as represented by the curves a and b in FIG. 5A. On the other hand, if the phase adjustment gear 23 is moved to rotate the first phase adjustment gear 35 and the second phase adjustment gear 36 respectively in the opposite directions by 90 degrees against the phase adjustment shaft 23, the phase difference between the first and second fixed eccentric weights 51A and 52A and the first and second eccentric weights 51B and 52B, which are arranged on the same shaft themselves, becomes zero as shown in FIG. 4C, and as shown in FIG. 5C, the sum of the volume of the vibromotive force or amplitude a and b obtainable by the eccentric weight on one side, i.e., the vibromotive force or amplitude twice the volume obtainable by the eccentric weight on one side (represented by the mark c in FIG. 5C), is obtained. In this respect, FIG. 4B illustrates the case where the phase difference is 90 degrees, and as in the case of FIGS. 4A and 4C, the volume as a sum of the vibromotive force or amplitude a and b, i.e., the volume of vibromotive force or amplitude represented by the mark c in FIG. 5B, is obtained.

Therefore, at the time of actuating the vibration generator 10, for example, the phase difference between the first and second fixed eccentric weights 51A and 52A and the first and second movable eccentric weights 51B and 52B, which are on the same shaft themselves, are defined as 180 degrees as shown in FIG. 4A, such state becomes the same as in the case of actuating a well-balanced flywheel. Then, the phase difference is gradually reduced from 180 degrees to zero degree by shifting the phase adjustment shaft 23 during the period that the electric motor 14 reaches its rated revolution subsequent to its actuation. Hence it becomes possible to rotate each of the eccentric weights smoothly without a great driving power; thus a smaller electric motor 14 can serve its purpose sufficiently, leading to the implementation of the energy saving.

In this respect, an electric motor is employed as a driving power source for generating the vibromotive force in the above-mentioned embodiment, but the driving power source is not limited thereto, and a hydraulic motor or the like may also be usable.

Furthermore, as a driving means for the phase adjustment shaft 23, the cylinder 50 is employed, but a driving means comprising a motor, a worm gear, a thrust shaft, and others may be employed, for example. Also, in the abovementioned embodiment, the phase adjustment shaft 23 is supported by the casing member 20, but it is not necessarily supported in such a fashion.

In addition, it may be possible to manufacture or couple integrally the first and second movable gears 32 and 34 and the first and second movable eccentric weights 51B and 52B. Also, the arrangement of the first rotational shaft 21, the second rotational shaft 22, and the phase adjustment shaft 23 may be appropriately modified as a matter of course.

Embodiment 2: (FIG. 6-FIG. 10)

Figure 6:
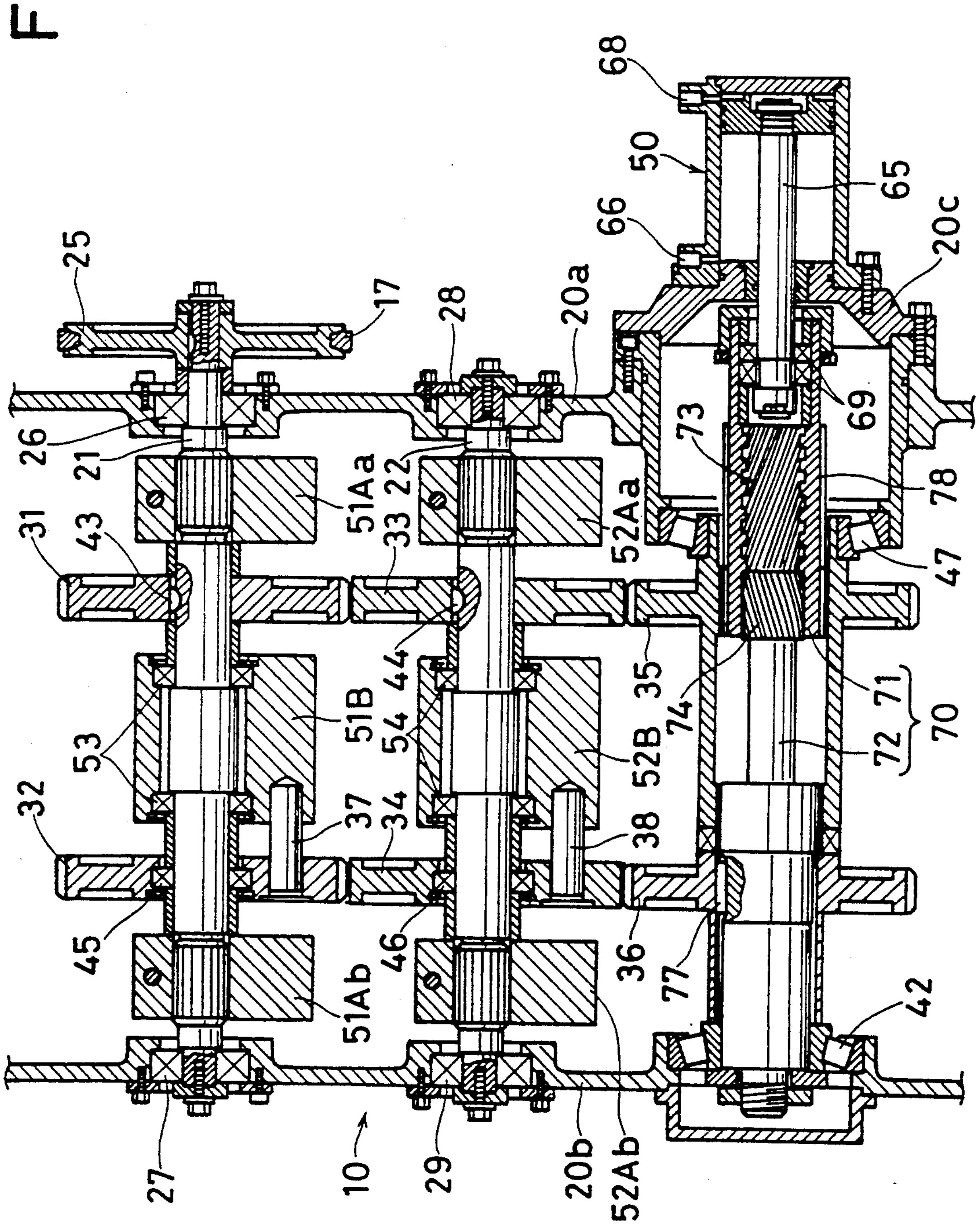
FIG. 6 is a development showing a second embodiment of the vibration generator according to the present invention.
Figure 7:
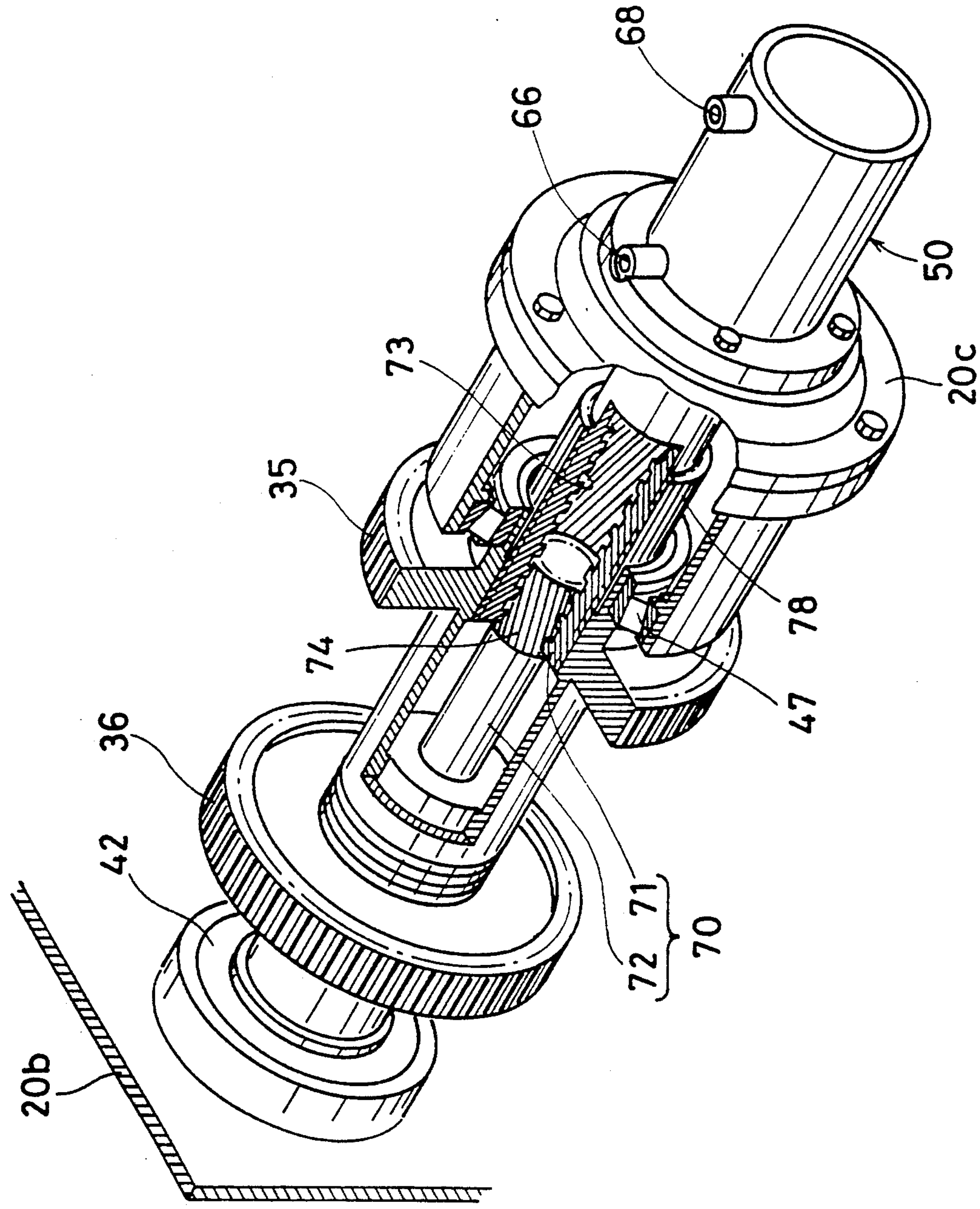
FIG. 7 is a perspective view showing the principal part of the second embodiment.

FIG. 6 is an development of a second embodiment of the vibration generator according to the present invention, and FIG. 7 is a perspective view showing the principal part thereof.

In the second embodiment, the portion corresponding to the phase adjustment shaft 23 in the above-mentioned first embodiment is the phase adjustment shaft 70 of a two divisional structure having a first adjustment shaft 71 and a second adjustment shaft 72. With the exception of this phase adjustment shaft 70 and its vicinity, the second embodiment is identical to the above-mentioned first embodiment. Therefore, the same reference marks are provided for those portions in common therebetween, and any repetitive descriptions will be omitted.

Of the first adjustment shaft 71 and second adjustment shaft 72, which constitute the phase adjustment shaft 70, the first adjustment shaft 71 is a tubular shaft as shown in FIG. 6 and FIG. 7 in detail, and on the outer periphery thereof, a linearly extending spline or keyway 78 is formed. On the inner periphery thereof, a first spirally irregular portion 73 is cut, the one end of which is connected to the leading end of the piston rod 65 of a hydraulic cylinder 50, which will be described later, through bearings 69 rotatively but in a state where its relative shifting in the axial direction is restricted. Also, on the outer periphery of the second adjustment shaft 72, a second spirally irregular portion 74 is cut to allow it to be fitted into the above-mentioned first spirally irregular portion 73. The second adjustment shaft is connected to the first adjustment shaft 71 through this second spirally irregular portion 74, and the other end thereof is rotatively supported by the side wall 20*b* of the casing member through a bearing 42.

On the wall portion 20*c* attachably provided for the casing member 20, a double action hydraulic cylinder 50 with an automatic locking system is installed as a driving means to shift the above-mentioned first adjustment shaft 71 in the axial direction. The hydraulic cylinder 50 has supply and exhaust ports 66 and 68 to supply or exhaust working oil from or to a hydraulic unit externally arranged and the piston rod 65 is allowed to advance or retract in accordance with the amount of the working oil to be supplied or exhausted. In order to control the traveling amount of this piston rod 65, a position detector (not shown) of differential pressure type or the like is arranged, for example.

Then, on the outer periphery of the above-mentioned first adjustment shaft 71, a first phase adjustment gear 35 is fitted from the outside and coupled thereto by the spline or keyway 78 to engage a second fixed driving gear 33. Also, on the outer periphery of the above-mentioned second adjustment shaft 72, a second phase adjustment gear 36 is fixed by a key 77 to engage a second movabled driving gear 34.

In the present embodiment of the vibration generator 10 having a structure such as mentioned above, the rotational driving power of the motor 14 is transmitted to the first adjustment shaft 71 through the belt 17 to the first rotational shaft 21→the first fixed driving gear 31→the second fixed driving gear 33→the first phase adjustment gear 35→and the spline 78 sequentially, and at the same time that the first rotational shaft 21, second rotational shaft 22 and phase adjustment shaft 70 are rotated in synchronism, the rotation of the first adjustment shaft 71 is transmitted to the movable driving gear 32 through the first spirally irregular portion 73→the second spirally irregular portion 74→the second adjustment shaft 72→the second phase adjustment gear 36→and the second movable driving gear 34 sequentially.

Figure 8:
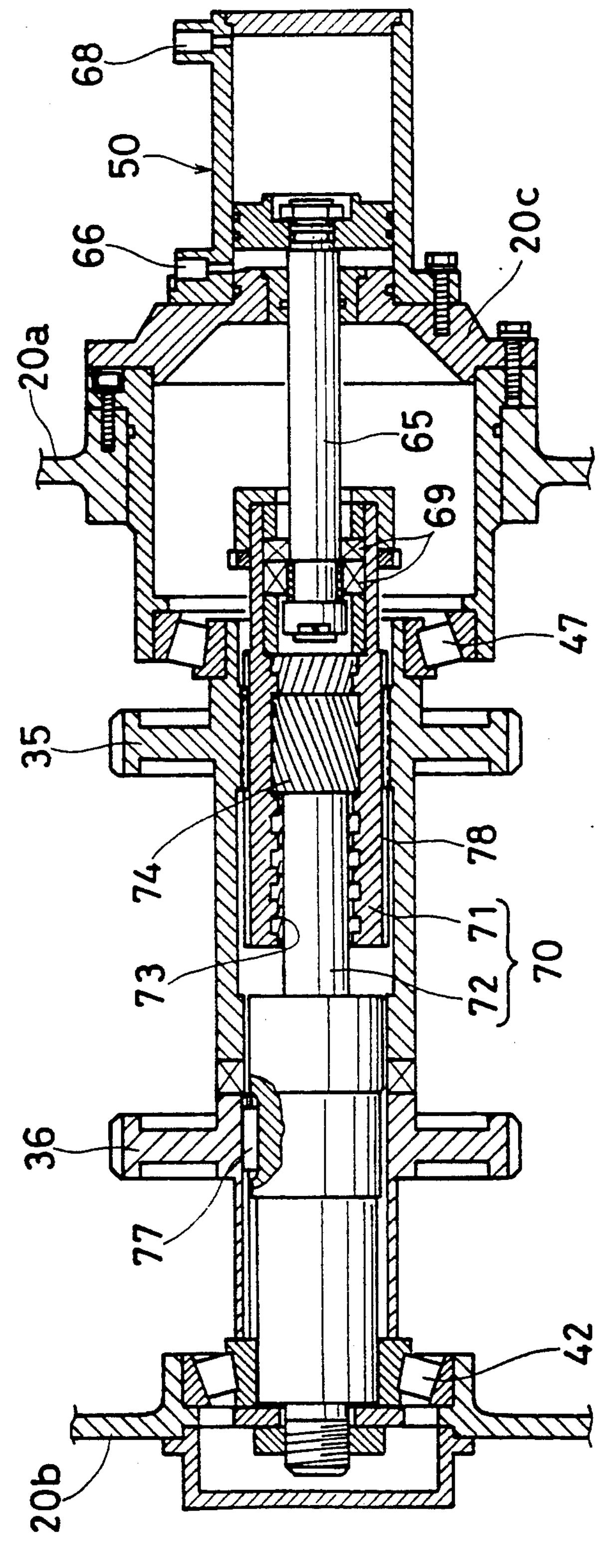
FIG. 8 is a view illustrating the operation of the second embodiment.

Here, if the first adjustment shaft 71 is forcibly traveled in the axial direction by the hydraulic cylinder 50 as shown in FIG. 8, the first adjustment shaft 71 and second adjustment shaft 72 are relatively rotated in the opposite directions to each other in response to the traveling distance of the first adjustment shaft 71 by the circumferential components of the spirally irregular portions 73 and 74 because the first spirally irregular portion 73 cut on the inner periphery of this first adjustment shaft 71 and the second spirally irregular portion 74 cut on the outer periphery of the second adjustment shaft 72 are fitted. Then, the phase of the first adjustment shaft 71 is advanced ahead or lagged behind the second adjustment shaft 72. In such state, the first phase adjustment gear 35 and second phase adjustment gear 36 are rotated integrally with the phase adjustment shaft 70.

Then, when the phase difference is generated between the first phase adjustment gear 35 and second phase adjustment gear 36 in this fashion, the first and second movable driving gears 32 and 34 are relatively rotated with respect to the first and second rotational shaft 21 and 22, and the phase difference is generated between the first and second rotational shafts and the first and second fixed eccentric weights 51A and 52A mounted thereon, and the first and second eccentric weights 51B and 52B coupled to the first and second movable gears 32 and 34. Thus, the vibromotive force or amplitude provided for the casing member 20 through the rotational shafts 21 and 22 are varied to obtain the same functional effect as in the above-mentioned first embodiment.

In the description set forth above, while the first spirally irregular portion 73 is cut on the inner periphery of the first adjustment shaft 71 and at the same time, the second spirally irregular portion 74 is cut on the outer periphery of the second adjustment shaft 72 to be fitted into the above-mentioned first spirally irregular portion 73 as the first motion converting means to convert linear motion to rotational motion to provide the phase difference for the pair of phase adjustment gears 35 and 36 in the above-mentioned embodiment, the means for providing the phase difference for the pair of phase adjustment gears 35 and 36 is not limited thereto.

Figure 9:
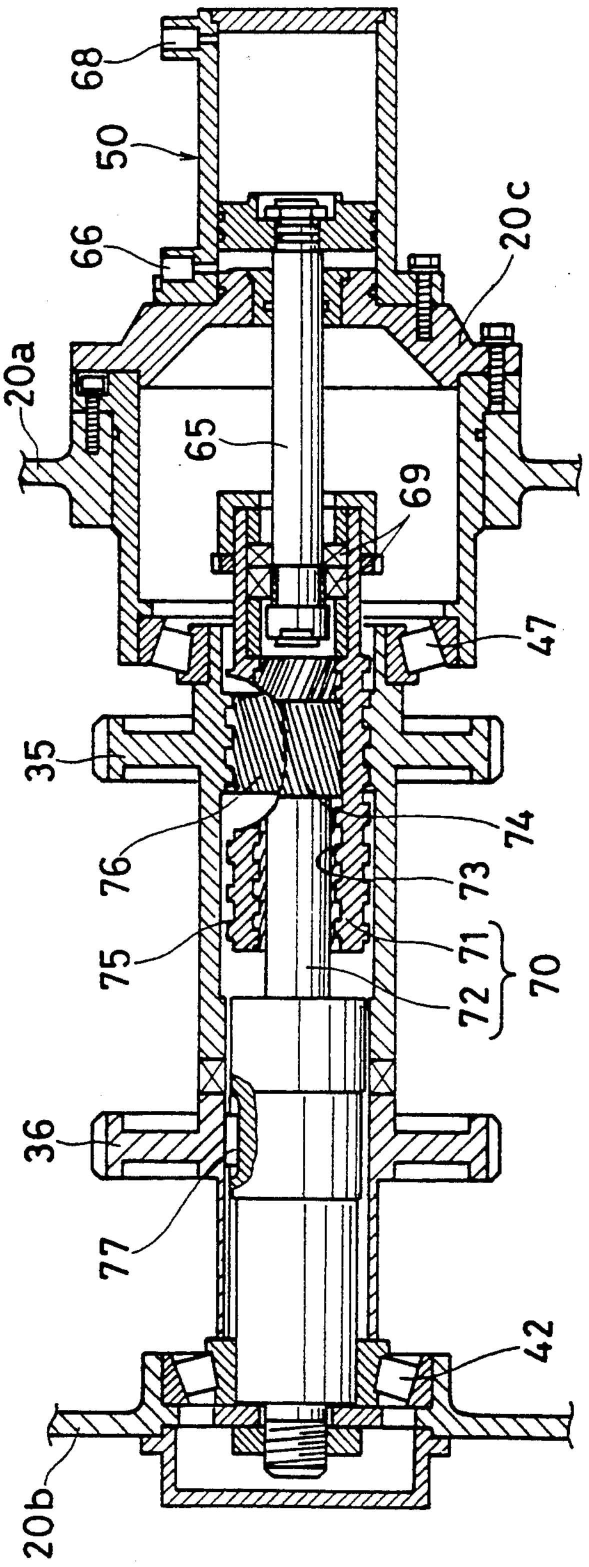
FIG. 9 is a cross-sectional view illustrating a variation of the second embodiment.
Figure 10:
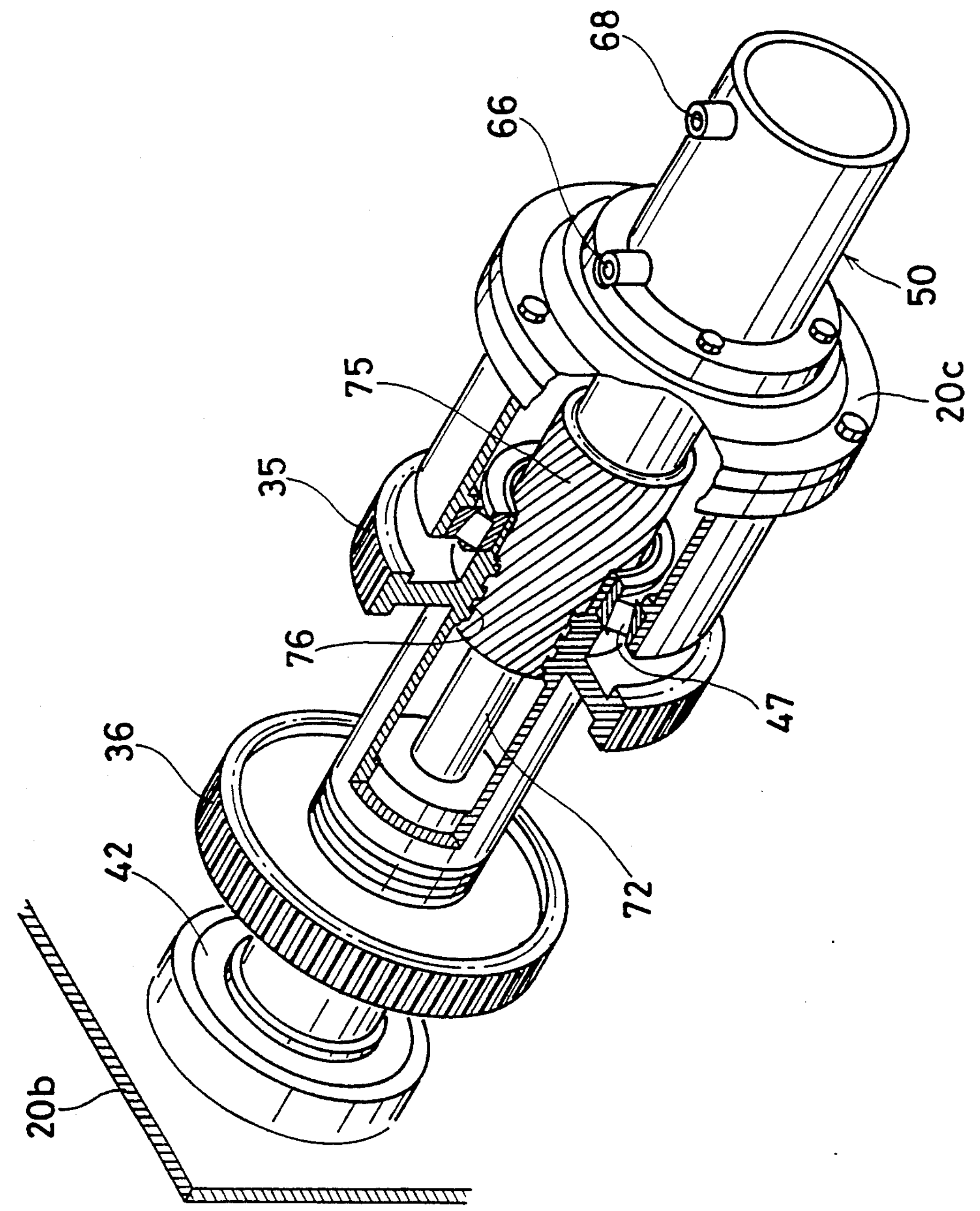
FIG. 10 is a partially cutaway perspective view illustrating the variation of the second embodiment.

As another embodiment, it may be possible to form a means for providing the phase difference for the pair of these gears by using the first adjustment shaft 71 having the first spirally irregular portion 73 cut therein and the second adjustment shaft 72 having the second spirally irregular portion 74 cut on the outer periphery thereof to fit into the above-mentioned first spirally irregular portion 73 as shown in FIG. 9 and FIG. 10, and further, by cutting on the outer periphery of the first adjustment shaft 71 a third spirally irregular portion 75 having the opposite phase to the first spirally irregular portion 73 formed on the inner periphery thereof as a second motion converting means to convert linear motion to rotational motion, as well as by forming on the inner periphery of the first phase adjustment gear 35 fitted from the outside on the first adjustment shaft 71 a fourth spirally irregular portion 76 to be fitted onto the third spirally irregular portion 75 cut on the outer periphery of the first adjustment shaft 71. In this case, by the double feeding means with the opposite phase, the phase difference is provided for the pair of phase adjustment gears 35 and 36. Therefore, it becomes possible at least either one of the abovementioned first adjustment shaft 71 and second adjustment shaft 72 to reduce the traveling amount in the axial direction by half.

As still another embodiment, it may be possible to provide the phase difference for the pair of phase adjustment gears 35 and 36 by the application of the second motion converting means only without the arrangement of the above-mentioned first motion converting means while connecting the first adjustment shaft 71 and second adjustment shaft 72 with a spline coupler capable of traveling relatively in the axial direction, for example.

Embodiment 3: (FIG. 11-FIG. 14)

Figure 11:
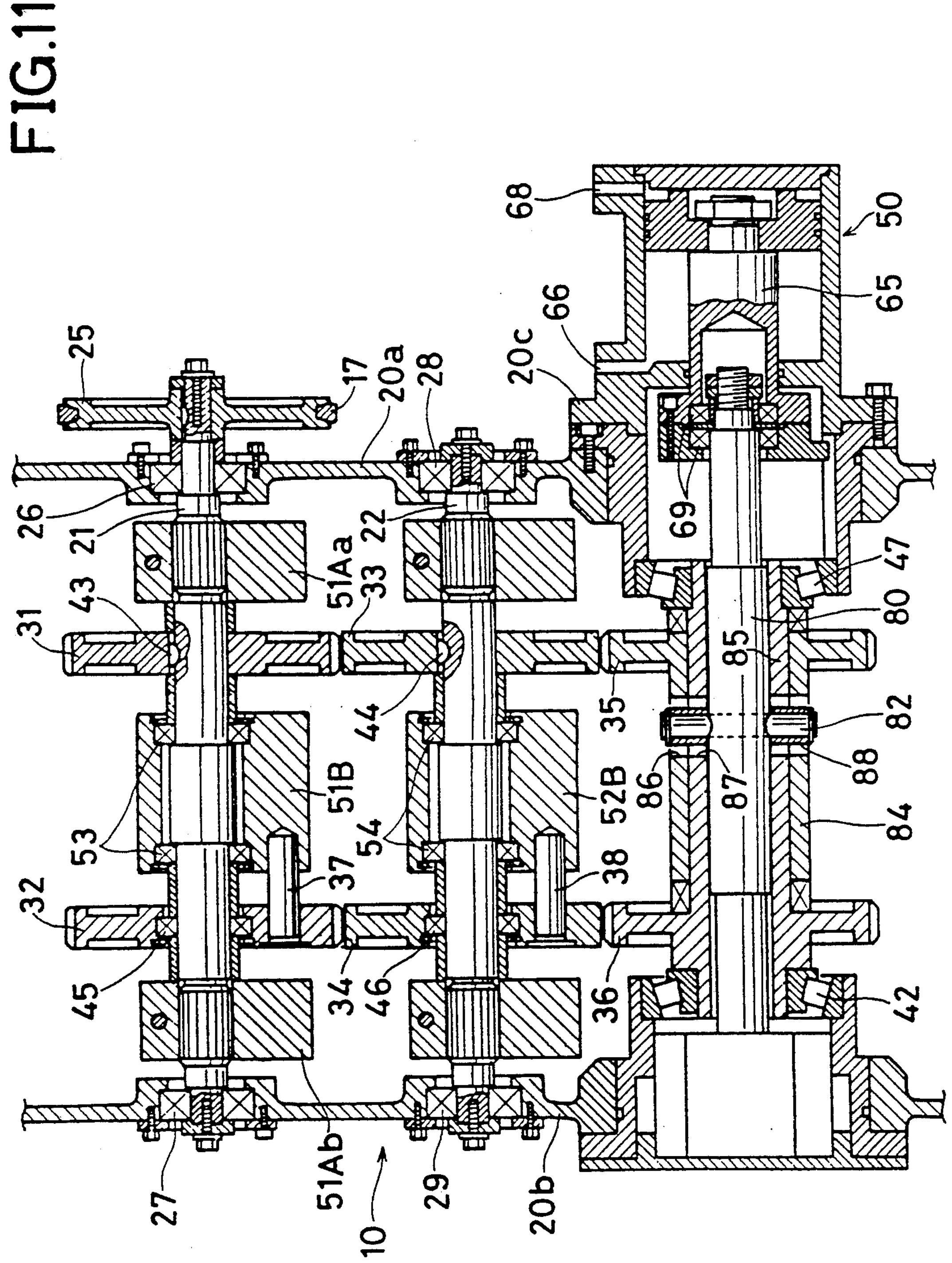
FIG. 11 is a development showing a third embodiment of the vibration generator according to the present invention.
Figure 12:
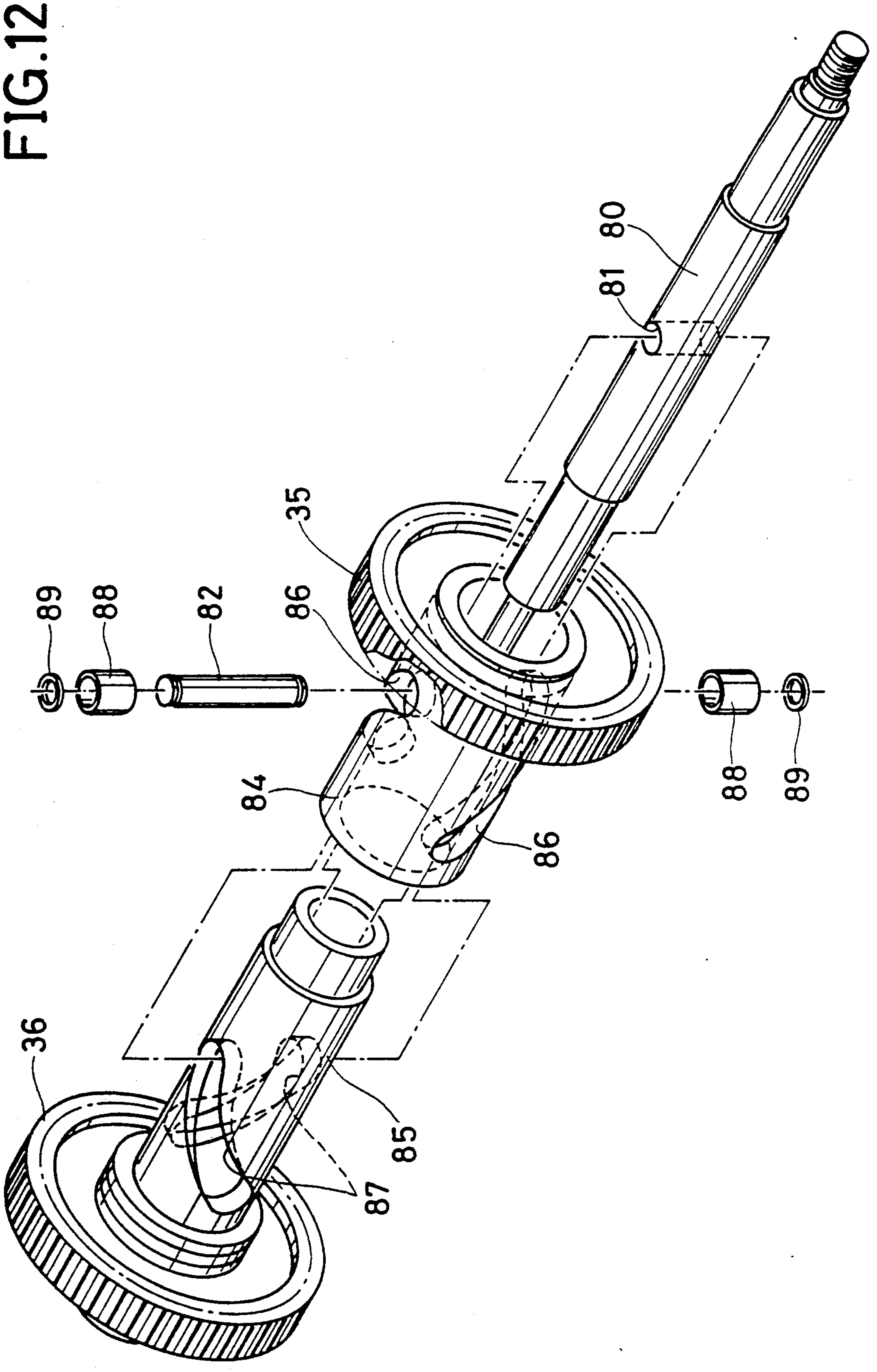
FIG. 12 is an exploded perspective view showing the principal part of the third embodiment.
Figure 13:
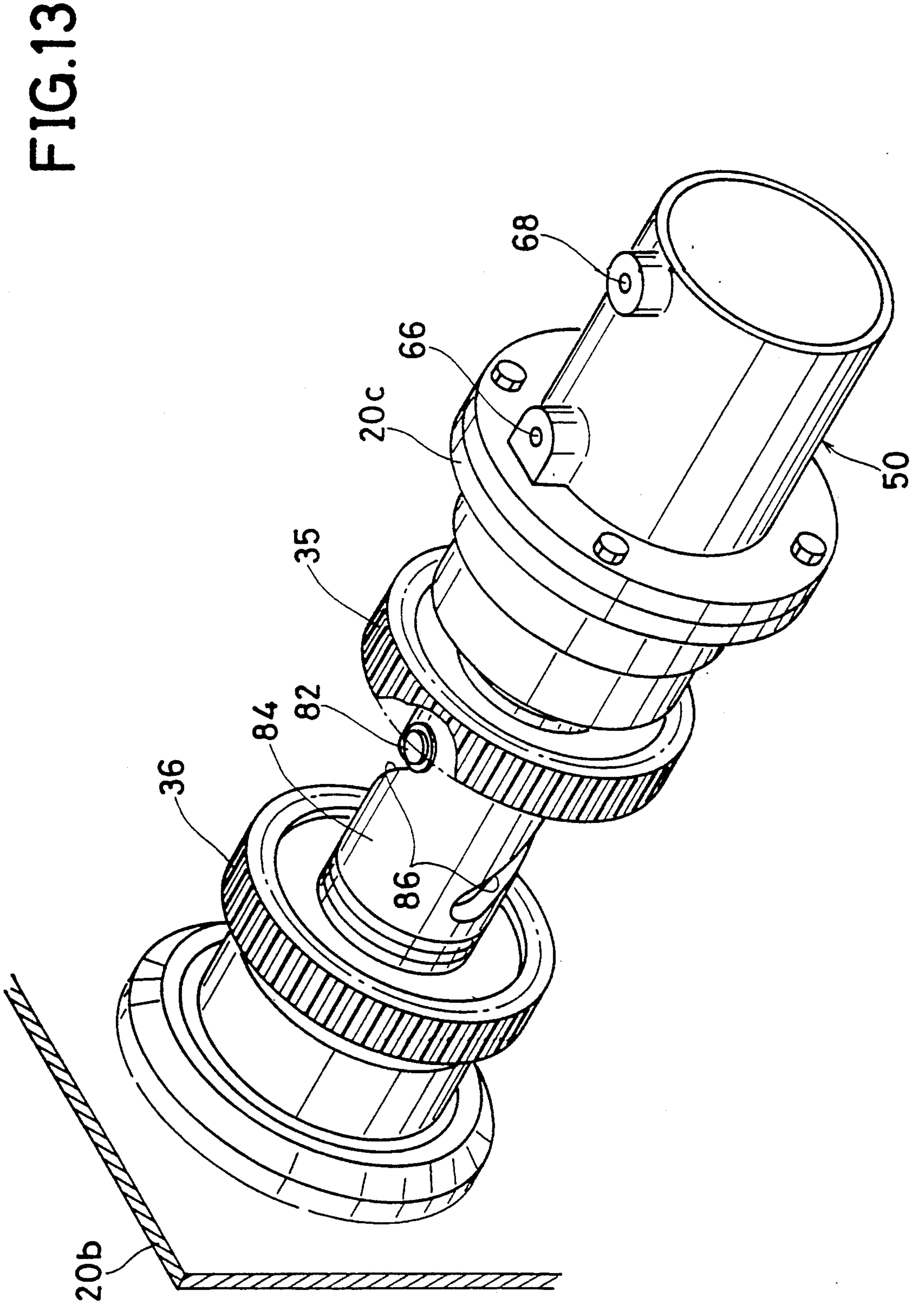
FIG. 13 is an assembled perspective view showing the principal part of the third embodiment.
Figure 14:
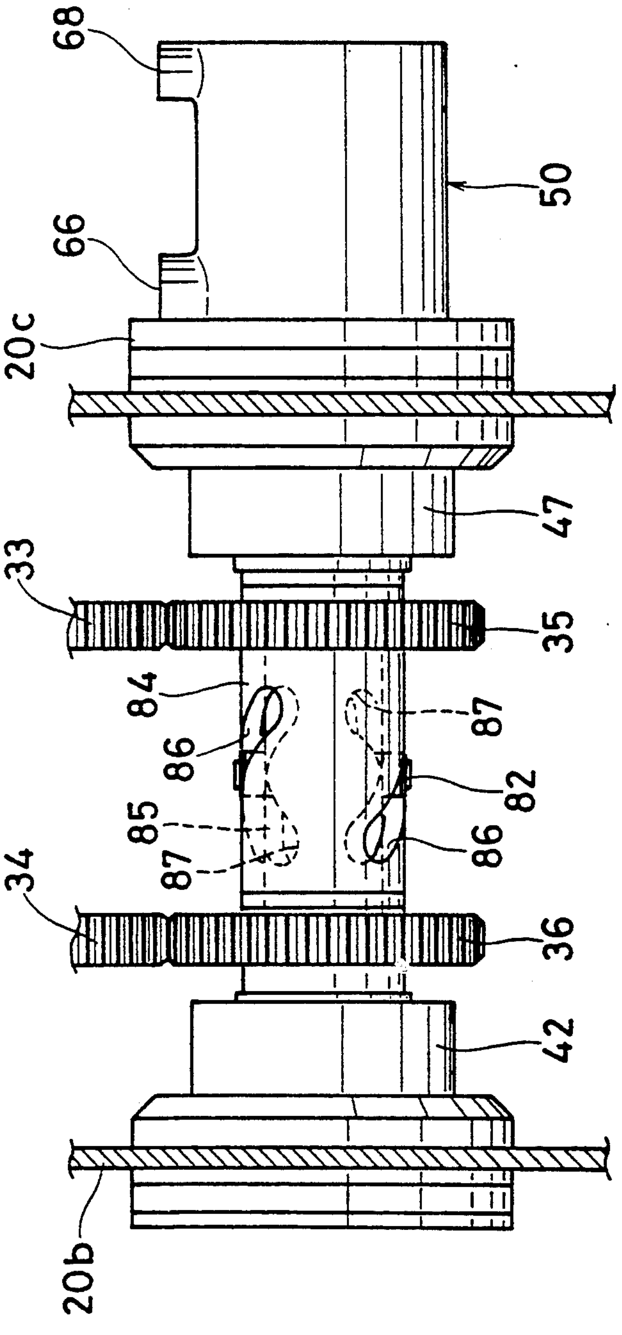
FIG. 14 is a view illustrating the operation of the third embodiment.

FIG. 11 is a development of a third embodiment of the vibration generator according to the present invention. FIG. 12 and FIG. 13 are perspective views showing the principal part thereof disassembled and assembled respectively.

Also, for this third embodiment, the common reference marks are provided for the portions corresponding to those appearing in the above-mentioned first and second embodiments, and any repetitive descriptions thereof will be omitted.

The phase adjustment shaft 80 of the present embodiment is also arranged beneath the first and second rotational shafts 21 and 22 rotatively and in parallel therewith, and the one end thereof is connected to the leading end of the piston rod 65 of the hydraulic cylinder 50 through bearings 69 rotatively but in a state that is relative travel in the axial direction is restricted. Also, the other end of the phase adjustment shaft 80 is rotatively supported by the side wall 20*b* of the casing member through a bearing 42. In the phase adjustment shaft 80, an insertion hole 81 is formed through in the radial direction in the central portion thereof as shown in FIG. 12 in detail. To this insertion hole 81, a pin 82 is press fitted with its both ends being projected from the shaft by the predetermined length respectively.

Then, to the above-mentioned phase adjustment shaft 80, a first phase adjustment gear 35 to engage with the second fixed gear 33 and a second phase adjustment gear 36 to engage with the second movable driving gear 34 are fitted from the outside to be relatively rotative but in a state that each of them is restricted in traveling in the axial direction. For the first phase adjustment gear 35, an elongated boss portion 84 having a large diameter is provided, and a pair of spirally elongated holes 86 are formed on this large-diameter elongated boss portion 84 with phase difference of 180 degrees facing each other in the same direction. Also, for the second phase adjustment gear 36, a small-diameter elongated boss portion 85 is provided to be inserted into the large-diameter elongated boss portion 84, and on this small-diameter elongated portion 85, a pair of spirally elongated holes 87 having the opposite phase to the above-mentioned spirally elongated holes 86 are formed with phase difference of 180 degrees facing each other in the same direction. To these spirally elongated holes 86 and 87, the both ends of the pin 82 press fitted in the above-mentioned insertion hole 81 formed on the phase adjustment shaft 80 are inserted. At the both ends of the pin 82, sleeve type rotational rings 88 are rotatively fitted so as to reduce the sliding resistance between these ends and the spirally elongated holes 86 and 87 and at the same time, washers 89 are fittedly mounted to check them to fall off.

In the vibration generator 10 of the present embodiment having such structure as mentioned above, the rotational driving force of the motor 14 is transmitted to the phase adjustment shaft 80 through the belt 17 to the first rotational shaft 21→the first fixed driving gear 31→the second driving gear 33→the first phase adjustment gear 35→and the pin 82 sequentially. The first rotational shaft 21, second rotational shaft 22, and phase adjustment shaft 80 are rotated in synchronism and at the same time, the rotational of the phase adjustment shaft 80 is transmitted to the pin 82→the second phase adjustment gear 36→the second movable driving gear 34→and the first movable driving gear 32 sequentially.

Here, when the phase adjustment shaft 80 is forcibly traveled in the axial direction by the cylinder 50, the first phase adjustment gear 35 and second phase adjustment gear 36 are rotated in the opposite direction to each other in response to the traveling distance of the phase adjustment shaft 80 by the circumferential components of the spirally elongated holes 86 and 87 because the pin 82 planted on this phase adjustment shaft 80 is inserted into the spirally elongated holes 86 and 87 provided respectively on the first phase adjustment gear 35 and second phase adjustment gear 36 with the opposite phases. Then, these phases are advanced or lagged degree by degree of an equal angle, and in such state, the first phase adjustment gear 35 and second phase adjustment gear 36 are rotated integrally with the phase adjustment shaft 80.

Now, when the phase difference is generated between the first phase adjustment gear 35 and second phase adjustment gear 36 in such a way, the first and second movable driving gears 32 and 34 are relatively rotated with respect to the first and second rotational shafts 21 and 22, and the phase difference is generated between the first and second rotational shafts and the first and second fixed eccentric weights 51A and 52A mounted thereon, and the first and second movable eccentric weights 51B and 52B coupled to the first and second movable driving gears 32 and 34, thereby causing the vibromotive force or amplitude provided for the casing member 20 through the first and second shafts 21 and 22 to be varied. As a result, the same functional effect as in the case of the above-mentioned first embodiment is obtainable.

In this respect, while the spirally elongated holes 86 and 87 are formed respectively on the first phase adjustment gear 35 and second phase adjustment gear 36 to rotate them in the opposite directions by approximately 90 degrees at a time in the above-mentioned example, it may be possible to form the spirally elongate holes on only one of them. In such a case, the shape of the spirally elongated holes should be selected so that one of them is relatively rotated 0 degree to 180 degrees with respect to the phase adjustment shaft.

Embodiment 4: (FIG. 15-FIG. 18)

Figure 15:
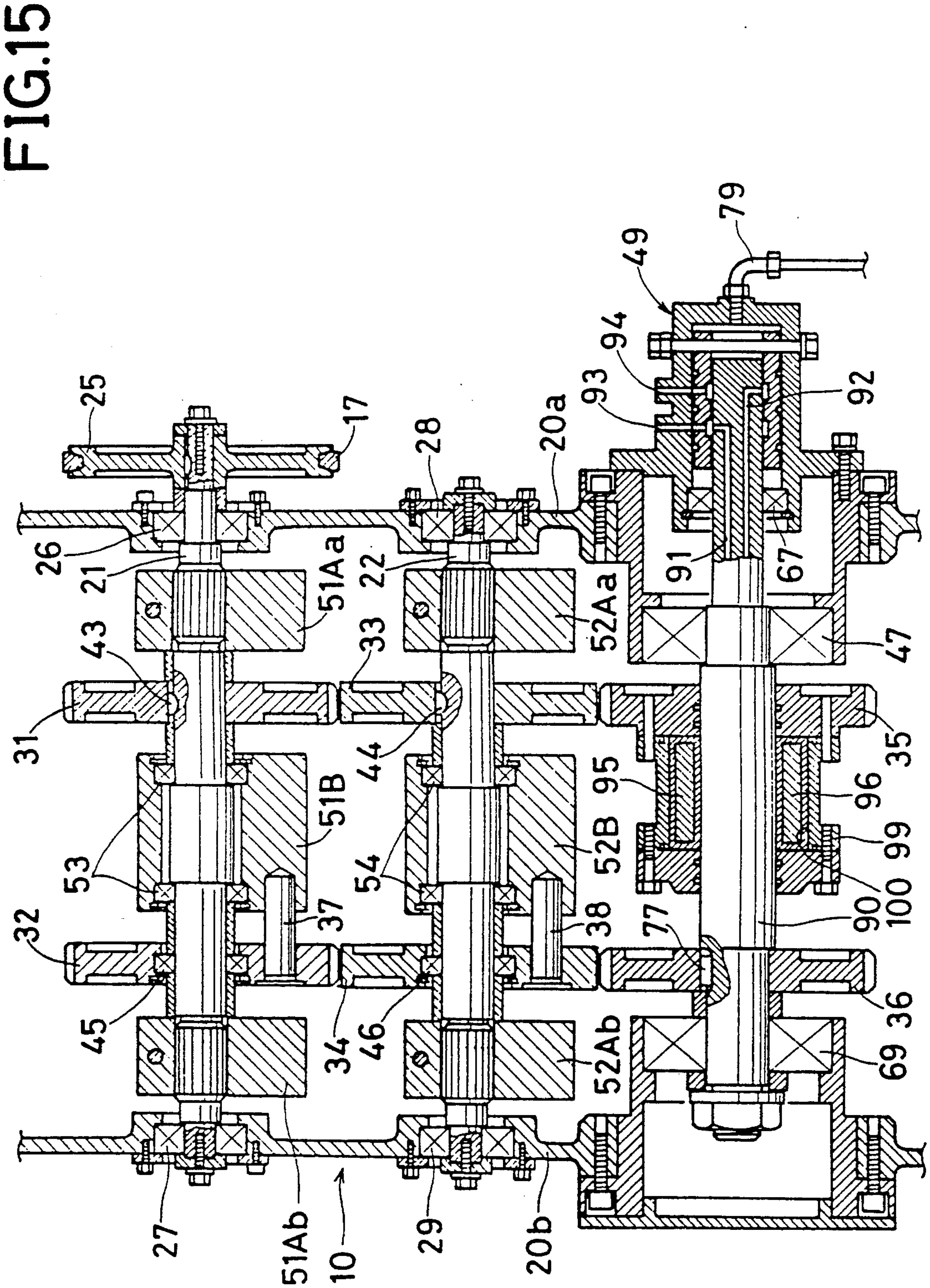
FIG. 15 is a development showing a fourth embodiment of the vibration generator according to the present invention.
Figure 16:
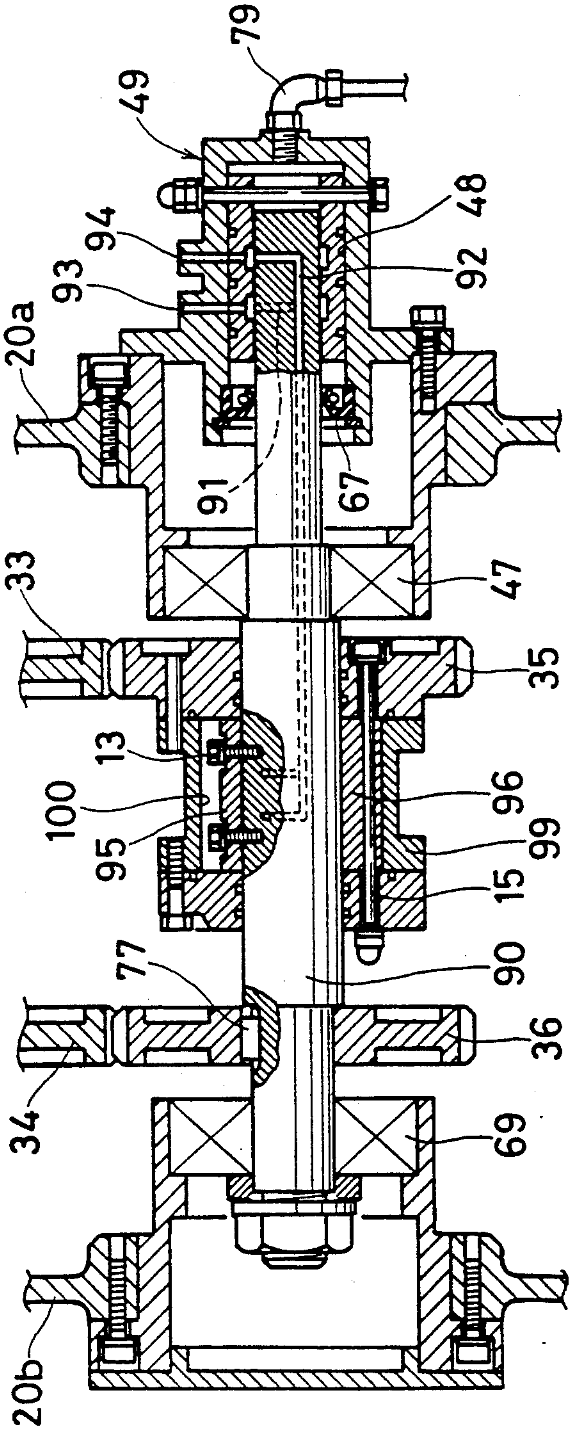
FIG. 16 is a partially cutaway front view showing the principal part of the fourth embodiment.
Figure 17:
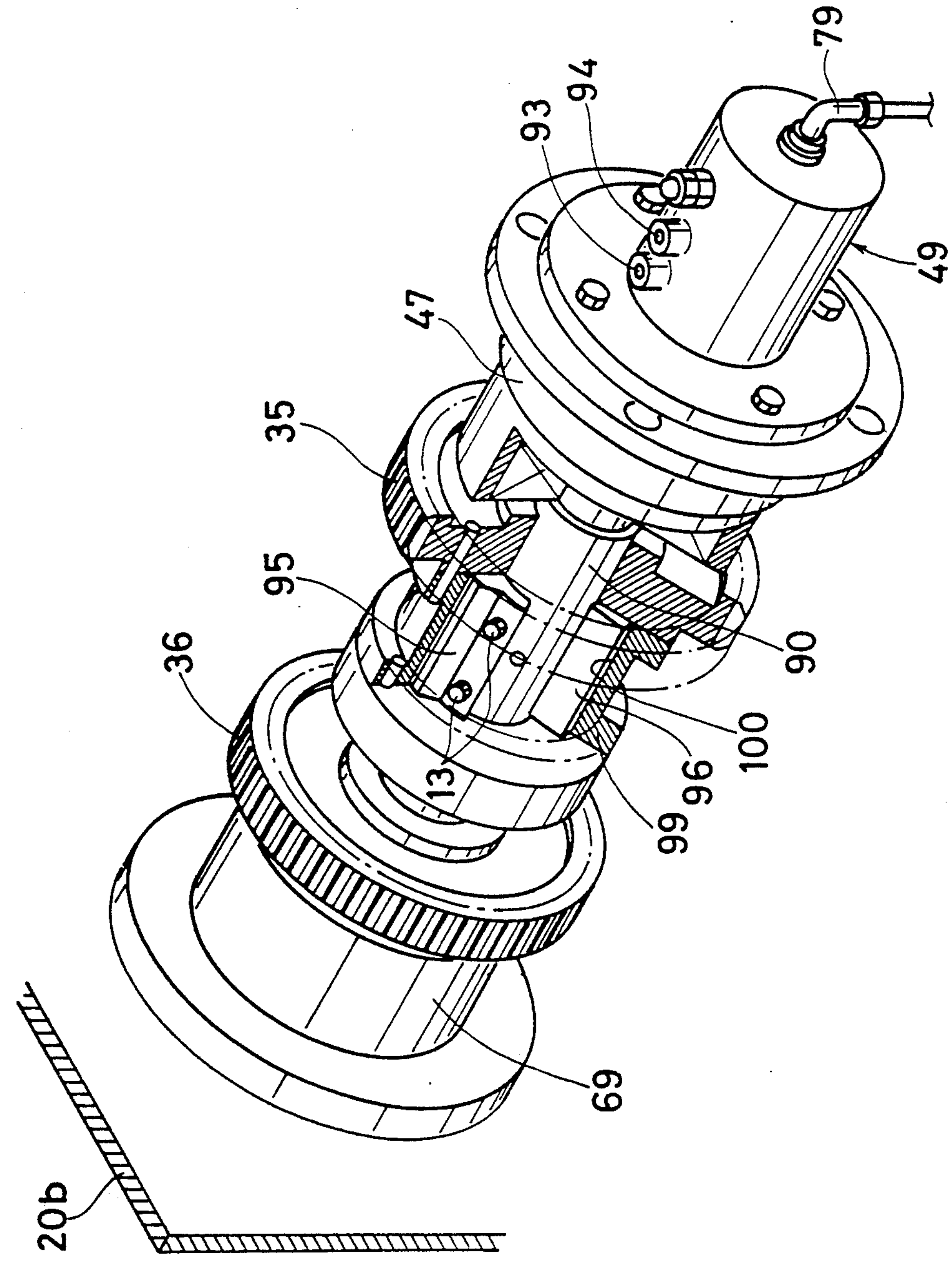
FIG. 17 is a perspective view showing the principal part of the fourth embodiment.

FIG. 15 is a development showing a fourth embodiment of the vibration generator according to the present invention. FIG. 16 and FIG. 17 are a partially cutaway plan view showing the principal part thereof and a perspective view showing the assembly thereof.

In the fourth embodiment, the common reference marks are also provided for the members corresponding to those appearing in the above-mentioned first embodiment and second embodiment, and any repetitive descriptions thereof will be omitted.

The phase adjustment shaft 90 of the present embodiment is also located beneath the first and second rotational shafts 21 and 22 in parallel therewith, and the both ends are respectively supported by the side walls 20*a* and 20*b* through bearings 69 and 47 rotatively but in a state that its relative traveling in the axial direction is restricted. In the inside of this shaft, two hydraulic pressure passages 91 and 92 are formed as shown in FIG. 16 and FIG. 17 in detail, and the one end thereof is covered with a covering member 49 through a sealer 67 and a spacer 48. On the spacer 48 and the covering member 49, there are formed supply and exhaust paths 93 and 94 connectively communicated with the above-mentioned hydraulic pressure passages 91 and 92, and at the same time, a drain path 79 is connected to the rear end of the covering member. Through the above-mentioned supply and exhaust paths 93 and 94, working oil is supplied from or exhausted to a hydraulic unit externally arranged by way of the system having a switching valve and other, and subsequently, the working oil is supplied to or exhausted from a hydraulic pressure actuation chamber 100, which will be described later, through the above-mentioned hydraulic pressure passages 91 and 92.

Then, to this phase adjustment shaft 90, a first phase adjustment gear 35 to engage with the second fixed driving gear 33 and a second phase adjustment gear 36 to engage with the second movable driving gear 34 are fitted from the outside in a state that the traveling in the axial direction is restricted respectively. The first phase adjustment gear 35 should be relatively rotative with respect to the phase adjustment shaft 90, and to one side portion thereof, an actuation chamber formation member 99 is coupled as shown in FIG. 16 and FIG. 17 in detail. In this actuation chamber formation member 99, there is formed a sleeve type hydraulic pressure actuation chamber 100 surrounded by the outer periphery of the phase adjustment shaft 90 and the side portion of the first phase adjustment gear 35. The hydraulic pressure actuation chamber 100 is closed by an appropriate sealer and the like, and in the inside thereof partitioned into a first actuation chamber 101 and a second actuation chamber 102 as shown in FIG. 18 indetail by a fixed partition wall portion 95 fixed to the phase adjustment shaft 90 by a pin 11 and a bolt 13 and a movable partition wall portion 96 fixed to the first phase adjustment gear 35 by a bolt 15. At the side end of the fixed partition wall portion 95 of the first actuation chamber 101, one end of the hydraulic passage 91 is opened, and at the side end of the fixed partition wall portion 95 of the second actuation chamber 102, one end of the hydraulic pressure passage 92 is opened. On the other hand, the second phase adjustment gear 36 is fixed to the phase adjustment shaft 90 by a key 77.

In the vibration generator 10 of the present embodiment having a structure as mentioned above, the rotational driving power of the motor 14 is transmitted to the adjustment shaft 90 through the belt 17 to the first rotational shaft 21→the first fixed driving gear 31→the second fixed driving gear 33→the first phase adjustment gear 35→the hydraulic pressure actuation chamber 100 sequentially in a state that the hydraulic pressure chamber is filled with the working oil from the hydraulic pressure until through the hydraulic pressure passages 91 and 92, and the first rotational shaft 21, second rotational shaft 22, and phase adjustment shaft 90 are rotated in synchronism and at the same time, the rotational of the phase adjustment shaft 90 is transmitted to the second phase adjustment gear 36→the second movable driving gear 34→the first movable driving gear 32 sequentially.

Figure 18A:
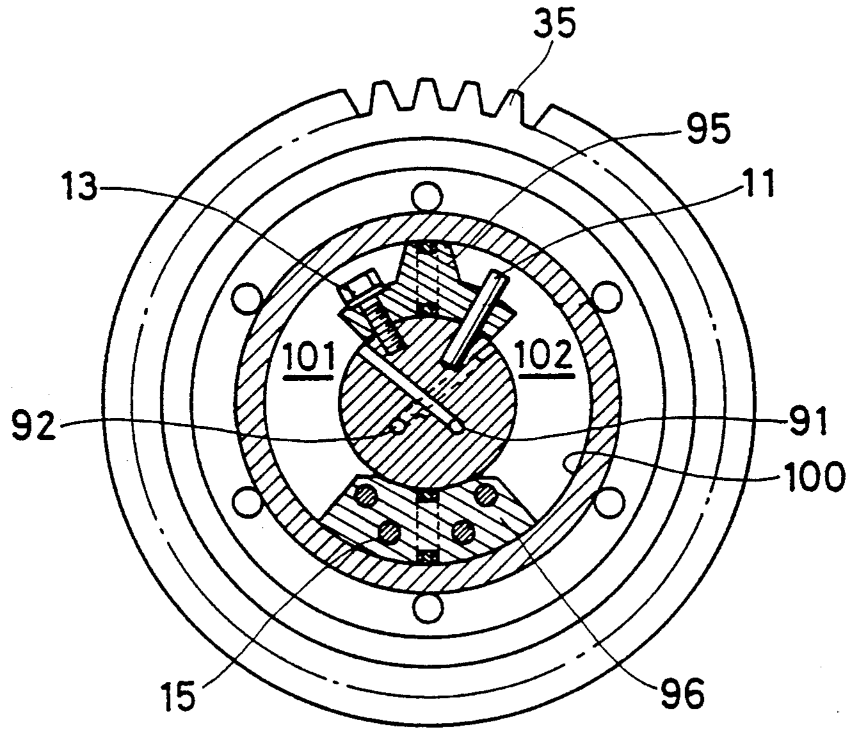
FIG. 18 A and B are views illustrating operation sequence of the fourth embodiment.
Figure 18B:
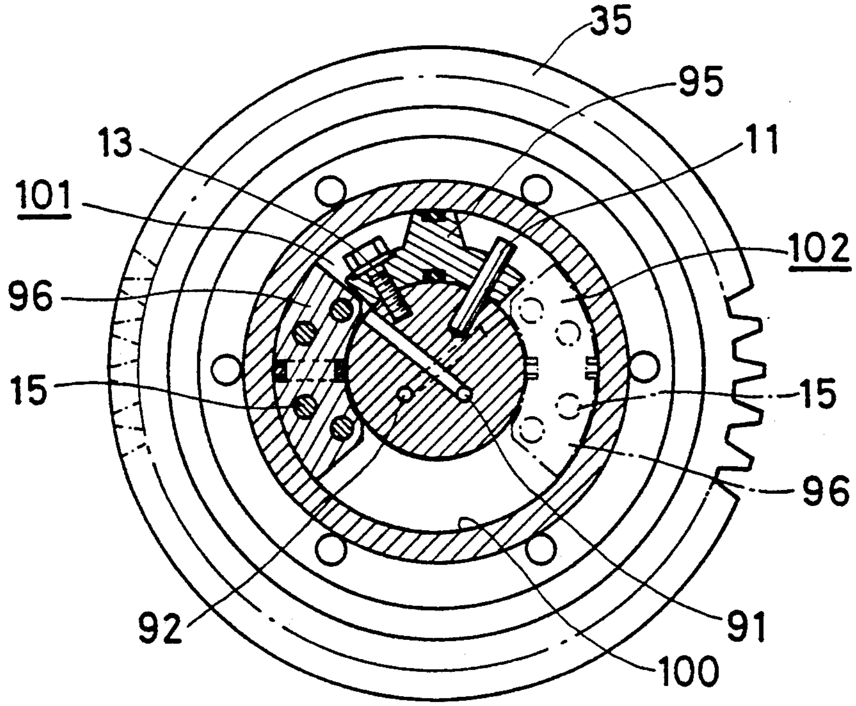

Here, if the valve position of the hydraulic piping arrangement is switched to exhaust the working oil from the first actuation chamber 101 through the hydraulic pressure passage 91 and at the same time, to supply the working oil to the second actuation chamber 102 through the hydraulic pressure passage 92, the movable partition wall portion 96, accompanied with the first phase adjustment gear 35, is rotationally moved around the phase adjustment shaft 90 (for example, being shift from the state shown in FIG. 18A to the one shown in FIG. 18B). As a result, the first phase adjustment gear 35 is relatively rotated with respect to the second phase adjustment gear 36, and phase difference is generated between therebetween. In such state, the first phase adjustment gear 35 and second phase adjustment gear 36 are rotated integrally with the phase adjustment shaft 90.

Then, when the phase difference is generated between the first phase adjustment gear 35 and second phase adjustment gear 36 in such a fashion, the first and second movable gears 32 and 34 are relatively rotated with respect to the first and second rotational shafts 21 and 22, and the phase difference is generated between the first and second rotational shafts and the first and second fixed eccentric weights 51A and 52A mounted thereon and the first and second movable eccentric weights 51B and 52B coupled to the first and second movable driving gears 32 and 34, thereby causing the vibromotive force or amplitude provided for the casing member 20 through the first and second rotational shafts 21 and 22 to be varied to obtain the same functional effect as in the case of the above-mentioned embodiments.

As clear from the above descriptions, according to the vibration generator of the present invention, at least one of the phase adjustment gears is relatively rotated with respect to the phase adjustment shaft by traveling the phase adjustment shaft in the axial direction forcibly, or the second adjustment shaft in the axial direction with respect to the first adjustment shaft forcibly, or performing the supply or exhaust of a fluid to or from the fluid actuation chamber, and a pair of phase adjustment gears are rotated integrally with the phase adjustment shaft in a state that the phase difference is generated. Therefore, the phase difference is generated between the first and second fixed eccentric weights to which the rotation of one of the pair of the phase adjustment gears is transmitted, and the first and second movable eccentric weights coupled to the first and second movable driving gears to which the rotation of the other one of the pair of the phase adjustment gears is transmitted. Hence, the horizontal components generated for the respective eccentric weights are offset at all times, while the total value of the vertical components generated at the respective eccentric weights is caused to be varied in response to the phase difference between the first and second fixed eccentric weights and the first and second movable eccentric weights. As a result, the vibromotive force provided for the casing member is caused to be varied; thus making it possible to change the vibromotive force arbitrarily and infinitely, even during the operation as well as to obtain the advantage that the structure is extremely simple and rational. and is fabricated with ease.

What is claimed is:

1. A vibration generator comprising:

a first rotational shaft rotatively supported by a casing member with a first fixed driving gear and a first fixed eccentric weight fitted thereto from the outside and at the same time, a first movable driving gear and a first movable eccentric weight coupled to said gear fitted thereto from the outside to be relatively rotative;

a second rotational shaft rotatively supported by said casing member in parallel with said first rotational shaft and with a second fixed driving gear to engage said first fixed driving gear and a second fixed eccentric weight fitted thereto from the outside and at the same time, a second movable driving gear to engage said first movable driving gear and a second movable eccentric weight coupled to said gear being fitted from the outside to be relatively rotative;

a phase adjustment shaft arranged in parallel with said first and second rotational shafts and rotatively;

a pair of phase adjustment gears. at least one of which is fitted to said phase adjustment shaft from the outside to be relatively rotative in such a state that is traveling in the axial direction is restricted. and one of them engaging either one of said first and second fixed driving gears and the other engaging either one of said first and second movable driving gears: and phase changing means for relatively rotating one of said pair of phase adjustment gears with respect to the other.

2. The vibration generator according to claim 1, wherein said phase changing means comprises:

a motion converting means for converting the linear motion of the phase adjustment shaft in the axial direction to the relative rotation of said phase adjustment gear; and a driving means for forcing said phase adjustment shaft in the axial direction.

3. The vibration generator according to claim 1, wherein said phase changing means comprises:

a spiral groove or convexity provided in two locations on the outer periphery of the phase adjustment shaft in the rotative directions opposite to each other;

a convex portion or concave portion provided on the inner periphery of the pair of phase adjustment gears to be slidably fitted into said spiral groove or convexity; and a driving means for forcing said phase adjustment shaft in the axial direction.

4. The vibration generator according to claim 1, wherein the phase changing means comprises:

a pin provided projectingly through the phase adjustment shaft in a radial direction;

an elongated boss portion provided connectively at least to one of said pair of phase adjustment gears with a spirally elongated hole formed thereon to enable said pin to be fittingly inserted; and a driving means for forcing said adjustment shaft in the axial direction.

5. The vibration generator according to claim 4, wherein small-diameter elongated boss portions and large diameter elongated portions, each one of which is inserted into the other, are provided connectively to the pair of phase adjustment gears respectively. and the spirally elongated holes having opposite phases are formed on these elongated boss portions to enable said pin to be fittingly inserted thereinto.

6. A vibration generator comprising:

a first rotational shaft rotatively supported by a casing member with a first fixed driving gear and a first fixed eccentric weight fitted thereto from the outside and at the same time. a first movable driving gear and a first movable eccentric weight coupled to said gear fitted thereto from the outside to be relatively rotative;

a second rotational shaft rotatively supported by said casing member in parallel with said first rotational shaft and with a second fixed driving gear to engage said first fixed driving gear and a second fixed eccentric weight fitted thereto from the outside and at the same time, a second movable driving gear to engage said first movable driving gear and a second movable eccentric weight coupled to said gear being fitted from the outside to be relatively rotative;

a phase adjustment shaft comprising a first adjustment shaft and a second adjustment shaft. being arranged in parallel with said first and second rotational shafts and rotatively. and further. the first adjustment shaft being arranged to be relatively traveled in the axial direction and relatively rotative with respect to the second adjustment shaft through a first motion converting means to convert linear motion to rotational motion;

a pair of phase adjustment gears. one of which is fitted from the outside to either one of the first adjustment shaft and second adjustment shaft and the other of which is fitted from the outside to the other one of the first adjustment shaft and second adjustment shaft respectively. and one of them engaging either one of said first and second fixed driving gears and the other engaging either one of said movable driving gears; and a driving means for forcing at least one of said first adjustment shaft and second adjustment shaft in the axial direction.

7. A vibration generator comprising:

a first rotational shaft rotatively supported by a casing member with a first fixed driving gear and a first fixed eccentric weight fitted thereto from the outside and at the same time. a first movable driving gear and a first movable eccentric weight coupled to said gear fitted thereto from the outside to be relatively rotative;

a second rotational shaft rotatively supported by said casing member in parallel with said first rotational shaft and with a second fixed driving gear to engage said first fixed driving gear and a second fixed eccentric weight fitted thereto from the outside and at the same time, a second movable driving gear to engage said first movable driving gear and a second movable eccentric weight coupled to said gear being fitted from the outside to be relatively rotative;

a phase adjustment shaft comprising a first adjustment shaft and a second adjustment shaft and being arranged in parallel with said first and second rotational shafts and rotatively, and further, the first adjustment shaft being arranged to be relatively traveled in the axial direction with respect to the second adjustment shaft;

a pair of phase adjustment gears, one of which is fitted from the outside to either one of the first adjustment shaft and second adjustment shaft to be relatively rotative through a second motion converting means to convert linear motion to rotational motion, and the other one of which is fitted from the outside to the other one of the first adjustment shaft and second adjustment shaft, and one of them engaging either one of said first and second fixed driving gears and the other engaging either one of said first and second movable driving gears; and a driving means for forcing at least one of said first adjustment shaft and second adjustment shaft in the axial direction.

8. A vibration generator comprising:

a first rotational shaft rotatively supported by a casing member with a first fixed driving gear and a first fixed eccentric weight fitted thereto from the outside and at the same time, a first movable driving gear and a first movable eccentric weight coupled to said gear fitted thereto from the outside to be relatively rotative;

a second rotational shaft rotatively supported by said casing member in parallel with said first rotational shaft and with a second fixed driving gear to engage said first fixed driving gear and a second fixed eccentric weight fitted thereto from the outside and at the same time, a second movable driving gear to engage said first movable driving gear and a second movable eccentric weight coupled to said gear being fitted from the outside to be relatively rotative;

a phase adjustment shaft comprising a first adjustment shaft and a second adjustment shaft and being arranged in parallel with said first and second rotational shafts and rotatively, and further, the first adjustment shaft being arranged to be relatively traveled in the axial direction and relatively rotative with respect to the second adjustment shaft through a first motion converting means to convert linear motion to rotational motion;

a pair of phase adjustment gears, one of which is fitted from the outside to either one of the first adjustment shaft and second adjustment shaft through a second motion converting means to convert linear motion to rotational motion, and the other one of which is fitted from the outside to the other one of the first adjustment shaft and second adjustment shaft, and one of them engaging either one of said first and second fixed driving gears and the other engaging either one of said first and second movable driving gears; and a driving means for forcing at least one of said first adjustment shaft and second adjustment shaft in the axial direction.

9. The vibration generator according to claim 6 or claim 8, wherein the first motion converting means comprises a first spirally irregular portion cut in the inner periphery of the first adjustment shaft and a second spirally irregular portion cut on the outer periphery of the second adjustment shaft to be fittingly inserted into said first spirally irregular portion.

10. The vibration generator according to claim 7 or claim 8, wherein a second motion converting means comprises a third spirally irregular portion cut on the inner periphery of one of the phase adjustment gears and a fourth spirally irregular portion cut on the outer periphery of the phase adjustment shaft to which said phase adjustment gear is fitted from the outside to be fittingly inserted into said third spirally irregular portion.

11. The vibration generator according to claim 8, wherein the directions of the rotational conversion by the first motion converting means and second motion converting means are the same.

12. A vibration generator comprising:

a first rotational shaft rotatively supported by a casing member with a first fixed driving gear and a first fixed eccentric weight fitted thereto from the outside and at the same time, a first movable driving gear and a first movable eccentric weight coupled to said gear fitted thereto from the outside to be relatively rotative;

a second rotational shaft rotatively supported by said said member in parallel with said first rotational shaft and with a second fixed driving gear to engage said first fixed driving gear and a second fixed eccentric weight fitted thereto from the outside and at the same time, a second movable driving gear to engage said first movable driving gear and a second movable eccentric weight coupled to said gear being fitted from the outside to be relatively rotative;

a phase adjustment shaft arranged in parallel with said first and second rotational shafts and rotatively; and a pair of phase adjustment gears, at least one of which is fitted from the outside to said phase adjustment shaft to be relatively rotative in a state that its traveling in the axial direction is restricted, and one of them engaging either one of said first and second fixed driving gears and the other engaging either one of said first and second movable driving gears, wherein a fluid actuation chamber is formed between the outer periphery of said adjustment shaft and one of said phase adjustment gears, and the structure is arranged to enable said phase adjustment gear to relatively rotate with respect to said phase adjustment shaft.

13. The vibration generator according to claim 12, wherein the liquid actuation chamber is partitioned by a fixed partition wall portion fixed to the phase adjustment shaft and a movable partition wall portion fixed to the phase adjustment gear.

* * * * *